US010542449B2

(12) United States Patent
Jung et al.

(10) Patent No.: US 10,542,449 B2
(45) Date of Patent: Jan. 21, 2020

(54) APPARATUS AND METHOD FOR TRANSMITTING OR RECEIVING SIGNAL IN MOBILE COMMUNICATION NETWORK

(71) Applicant: Samsung Electronics Co., Ltd., Gyeonggi-do (KR)

(72) Inventors: Ha-Kyung Jung, Seoul (KR); Beom-Sik Bae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/739,584

(22) PCT Filed: Jun. 20, 2016

(86) PCT No.: PCT/KR2016/006514
§ 371 (c)(1),
(2) Date: Dec. 22, 2017

(87) PCT Pub. No.: WO2016/208919
PCT Pub. Date: Dec. 29, 2016

(65) Prior Publication Data
US 2018/0317118 A1 Nov. 1, 2018

(30) Foreign Application Priority Data
Jun. 22, 2015 (KR) .................. 10-2015-0088152

(51) Int. Cl.
*H04W 28/02* (2009.01)
*H04W 16/14* (2009.01)
(Continued)

(52) U.S. Cl.
CPC ....... *H04W 28/0231* (2013.01); *H04W 16/14* (2013.01); *H04W 48/18* (2013.01)

(58) Field of Classification Search
CPC . H04W 28/0231; H04W 28/08; H04W 28/02; H04W 16/14; H04W 48/18; H04W 88/08
(Continued)

(56) References Cited

U.S. PATENT DOCUMENTS 8,315,629 B2    11/2012  Pamp et al.
9,232,434 B2 *   1/2016  Rong ................ H04W 28/0289
(Continued)

FOREIGN PATENT DOCUMENTS

WO    WO 2015/021370    2/2015

OTHER PUBLICATIONS

European Search Report dated May 15, 2018 issued in counterpart application No. 16814632.2-1215, 6 pages.
(Continued)

*Primary Examiner* — Yemane Mesfin
*Assistant Examiner* — Intekhaab A Siddiquee
(74) *Attorney, Agent, or Firm* — The Farrell Law Firm, P.C.

(57) ABSTRACT

The present invention relates a 5-th generation (5G) or pre-5G communication system provided to support a higher data transmission rate beyond a 4th-generation (4G) communication system such as long term evolution (LTE). The present invention relates to a method for transmitting or receiving a signal in a mobile communication network, the method comprising the steps of: detecting a traffic characteristic of a traffic provided to a terminal; determining, on the basis of the traffic characteristic, a first radio access technology (RAT) to be applied to an uplink of the terminal and a second RAT to be applied to a downlink of the terminal; and controlling the uplink and the downlink of the terminal on the basis of the first RAT and the second RAT.

18 Claims, 14 Drawing Sheets

(51) Int. Cl.
*H04W 48/18* (2009.01)
*H04W 28/08* (2009.01)
*H04W 88/08* (2009.01)

(58) Field of Classification Search
USPC .......................................................... 370/235
See application file for complete search history.

(56) References Cited

U.S. PATENT DOCUMENTS

| | | |
|---|---|---|
| 9,420,527 B2 * | 8/2016 | Falconetti ......... H04W 28/0215 |
| 2011/0044218 A1 | 2/2011 | Kaur et al. |
| 2012/0140743 A1 | 6/2012 | Pelletier et al. |
| 2013/0083661 A1 * | 4/2013 | Gupta .................... H04W 4/70 |
| | | 370/235 |
| 2013/0121282 A1 | 5/2013 | Liu |
| 2013/0163441 A1 | 6/2013 | Verma et al. |
| 2014/0213256 A1 * | 7/2014 | Meylan ................ H04W 48/18 |
| | | 455/436 |
| 2014/0369201 A1 | 12/2014 | Gupta et al. |
| 2015/0043486 A1 * | 2/2015 | Ozturk ................. H04W 88/06 |
| | | 370/329 |

OTHER PUBLICATIONS

PCT/ISA/237 Written Opinion issued on PCT/KR2016/006514 (pp. 5).
PCT/ISA/210 Search Report issued on PCT/KR2016/006514 (pp. 4).

\* cited by examiner ated data frame has been used from an IEEE 802.11n.

APPARATUS AND METHOD FOR TRANSMITTING OR RECEIVING SIGNAL IN MOBILE COMMUNICATION NETWORK

PRIORITY

This application is a National Phase Entry of PCT International Application No. PCT/KR2016/006514, which was filed on Jun. 20, 2016, and claims priority to Korean Patent Application No. 10-2015-0088152, which was filed on Jun. 22, 2015, the contents of each of which are incorporated herein by reference.

TECHNICAL FIELD

The present disclosure generally relates to an apparatus and method for transmitting/receiving a signal in a mobile communication network, and more particularly to an apparatus and method for transmitting/receiving a signal based on a traffic characteristic in a mobile communication network.

BACKGROUND ART

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

In order to support mobile traffic which has been rapidly increased, mobile communication providers have developed various techniques. A typical one of the various techniques is to interwork a small base station which uses a wireless local access network (LAN) scheme of an institute of electrical and electronics engineers (IEEE) 802.11 series including an IEEE 802.11a, an IEEE 802.11g, an IEEE 802.11n, an IEEE 802.11ac, an IEEE 802.11ad, an IEEE 802.11ax, and/or the like with a provider network.

Meanwhile, an IEEE 802.11 wireless LAN series of protocol has a characteristic that various forms of overhead such as a time interval between frames (inter-frame spacing), a physical layer header and a medium access control (MAC) layer header of a frame, an acknowledgement (ACK) frame transmission, and/or the like occurs for transmitting data through a wireless channel. This characteristic may make a proportion of overhead to data transmission relatively huge in a case of high-speed data transmission.

So, a MAC protocol data unit (MPDU) aggregation (A-MPDU) scheme as a scheme of generating one data frame by aggregating a plurality of data frames, e.g., a plurality of MPDUs and transmitting the generated data frame has been used from an IEEE 802.11n.

However, some applications generate a traffic pattern for which it is difficult to apply the A-MPDU scheme. A typical example of the traffic pattern which is difficult to apply the A-MPDU scheme is uplink-direction traffic for a download-dominated application such as a hyper text transfer protocol (HTTP) video, an HTTP audio, software update, Android Market, and/or the like.

In a case of applications which generate a traffic pattern for which it is difficult to apply the A-MPDU scheme, generally, data packets of a relatively big size are sequentially transmitted in a downlink, however, only a transmission control protocol (TCP) acknowledgement (ACK) packet for received downlink data packets is transferred in a uplink. Here, a downlink data packet has a relatively big size, e.g., a size of about 1500 bytes, however, a uplink data packet has a relatively small size, e.g., a size of about 40~52 bytes, which corresponds to a size of a TCP ACK packet. Generally, the TCP ACK packet is transmitted one time after two TCP data packets are received, so transmission frequency of the TCP ACK packet is ½ of transmission frequency of a TCP data packet.

So, in a uplink of the download-dominated application, a traffic pattern for which it is impossible to use an A-MPDU scheme supported in an IEEE 802.11 protocol is generated, and overhead such as amount of a transmitted packet data versus header transmission, a time interval between frames, and/or the like significantly increases.

The above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the present disclosure proposes an apparatus and method for transmitting/receiving a signal based on a traffic characteristic in a mobile communication network.

An embodiment of the present disclosure proposes an apparatus and method for transmitting/receiving a signal using a radio access technology (RAT) suitable for a traffic characteristic in a mobile communication network.

An embodiment of the present disclosure proposes an apparatus and method for transmitting/receiving a signal by separately considering an RAT applied to a downlink and an RAT applied to a uplink in a mobile communication network.

Technical Solution

A method for transmitting/receiving a signal in a mobile communication network according to an embodiment of the present disclosure is provided. The method includes detecting a traffic characteristic for traffic provided to a terminal, determining a first radio access technology (RAT) to be applied to a uplink for the terminal and a second RAT to be applied to a downlink for the terminal based on the traffic characteristic, and controlling the uplink and the downlink for the terminal based on the first RAT and the second RAT.

Another method for transmitting/receiving a signal in a mobile communication network according to an embodiment of the present disclosure is provided. The another method includes controlling a uplink based on a first radio access technology (RAT), and controlling a downlink based on a second RAT, wherein each of the first RAT and the second RAT is determined based on a traffic characteristic for traffic provided to a terminal.

A base station in a mobile communication network according to an embodiment of the present disclosure is provided. The base station includes a controller configured to detect a traffic characteristic for traffic provided to a terminal, to determine a first radio access technology (RAT) to be applied to a uplink for the terminal and a second RAT to be applied to a downlink for the terminal based on the traffic characteristic, and to control the uplink and the downlink for the terminal based on the first RAT and the second RAT.

A terminal in a mobile communication network according to an embodiment of the present disclosure is provided. The terminal includes a controller configured to control a uplink based on a first radio access technology (RAT), and to control a downlink based on a second RAT, wherein each of the first RAT and the second RAT is determined based on a traffic characteristic for traffic provided to a terminal.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure enables to transmit/receive a signal based on a traffic characteristic in a mobile communication network.

An embodiment of the present disclosure enables to transmit/receive a signal using a radio access technology (RAT) suitable for a traffic characteristic in a mobile communication network.

An embodiment of the present disclosure enables to transmit/receive a signal by separately considering an RAT applied to a downlink and an RAT applied to a uplink in a mobile communication network.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

Figure 1:
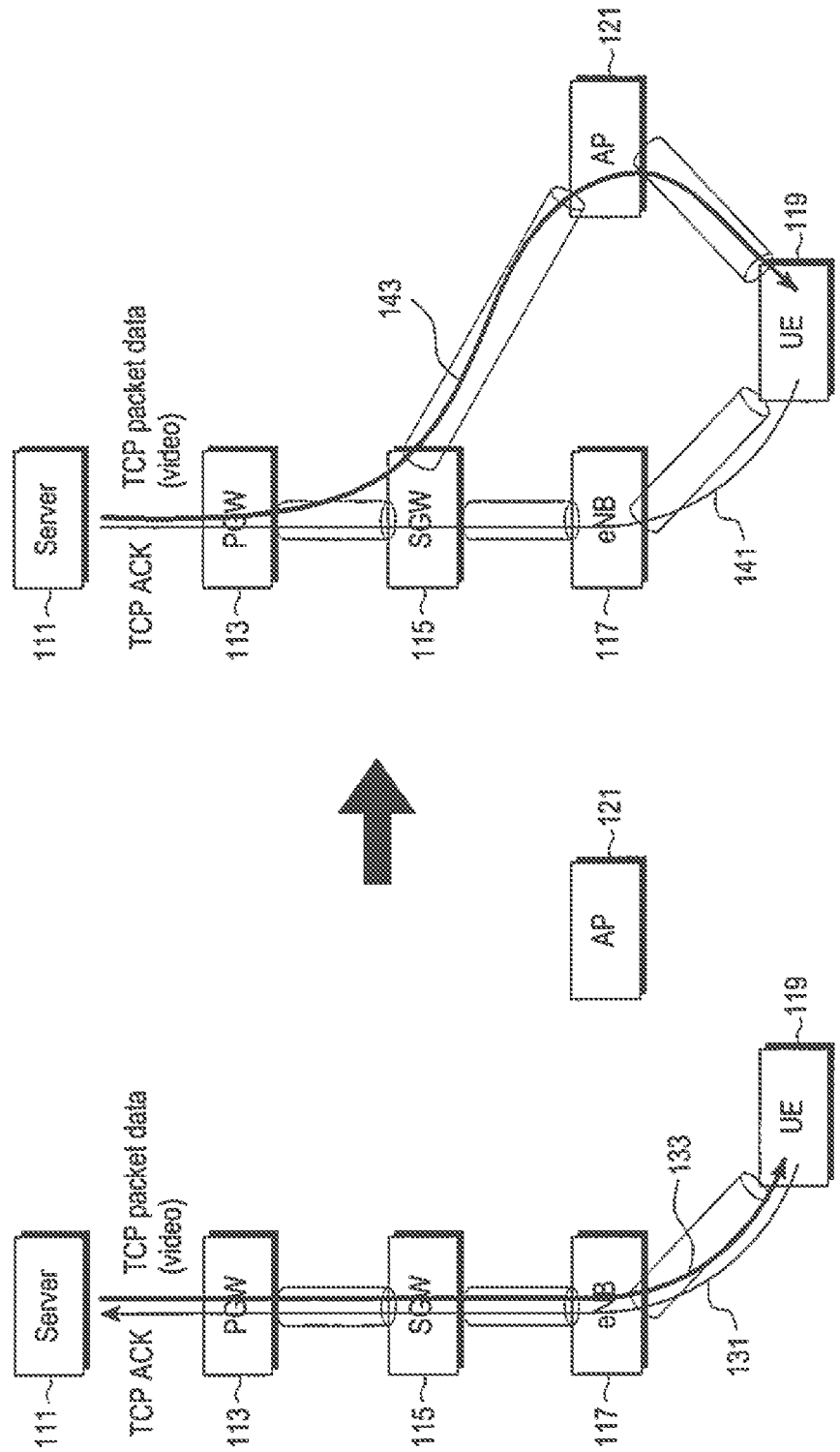
FIG. 1 schematically illustrates an inner structure of a mobile communication network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal transmitting apparatus may be, for example, a user equipment (UE) or a base station (BS), e.g., an evolved node B (eNB).

According to various embodiments of the present disclosure, a signal receiving apparatus may be a UE or a base station, e.g., an eNB.

For convenience, the term UE may be interchangeable with the terms terminal, wireless device, mobile station (MS), and/or the like. Further, the term base station may be interchangeable with the terms eNB, access point (AP), and/or the like.

An embodiment of the present disclosure proposes an apparatus and method for transmitting/receiving a signal based on a traffic characteristic in a mobile communication network.

An embodiment of the present disclosure proposes an apparatus and method for transmitting/receiving a signal using a radio access technology (RAT) suitable for a traffic characteristic in a mobile communication network.

An embodiment of the present disclosure proposes an apparatus and method for transmitting/receiving a signal by separately considering an RAT applied to a downlink and an RAT applied to a uplink in a mobile communication network.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an evolved packet system (EPS), and a mobile internet protocol (Mobile IP) system, and/or the like.

Hereinafter, in various embodiments of the present disclosure, it will be assumed that the number of RATs supportable by a UE is, for example, 2, and the two RATs include a wireless local access network (LAN) scheme and an LTE scheme. Here, the wireless LAN scheme is an RAT supporting a unlicensed band, and the LTE scheme is an RAT supporting a licensed band.

In various embodiments of the present disclosure, it will be assumed that the number of RATs supportable by an eNB is, for example, 2, and the two RATs include a wireless LAN scheme and an LTE scheme.

An inner structure of a mobile communication network according to an embodiment of the present disclosure will be described with reference to FIG. 1.

FIG. 1 schematically illustrates an inner structure of a mobile communication network according to an embodiment of the present disclosure.

Referring to FIG. 1, the mobile communication network includes a server 111, a packet data network (PDN) gateway (PGW) 113, a serving gateway (SGW) 115, an eNB 117, a UE 119, and an access point (AP) 121. Here, it will be assumed that the UE 119 uses a hyper text transfer protocol (HTTP) video application through an LTE RAT.

Firstly, in the mobile communication network, a connection among entities is set on a bearer basis, and the bearer is a set of internet protocol (IP) flows which have the same quality of service (QoS) requirement.

In a general mobile communication network, an EPS bearer is established between the UE 119 and the PGW 113, a data radio bearer is established between the UE 119 and the eNB 117, an S1 bearer is established between the eNB 117 and the SGW 115, and an S5 bearer is established between the SGW 115 and the PGW 113. In the general mobile communication network, a downlink transmission control protocol (TCP) data packet and a uplink TCP acknowledgement (ACK) packet of the HTTP video application are transmitted/received through the same bearer (131 and 133).

Meanwhile, in a mobile communication network according to an embodiment of the present disclosure, an EPS bearer is established between the UE 119 and the PGW 113, a data radio bearer is established between the UE 119 and the eNB 117, an S1 bearer is established between the eNB 117 and the SGW 115, and an S5 bearer is established between the SGW 115 and the PGW 113. Further, a downlink bearer is established through the AP 121 between the UE 119 and the SGW 115.

In an embodiment of the present disclosure, a uplink TCP ACK packet of an HTTP video application is transferred through a uplink bearer established among the UE 119, the eNB 117, the SGW 115, and the PGW 113 (141). In an embodiment of the present disclosure, a downlink TCP data packet of an HTTP video application is transferred through a downlink bearer established among the SGW 115, the AP 121, and the UE 119 (143). That is, in an embodiment of the present disclosure, a uplink TCP ACK packet of an HTTP video application is transferred using a licensed band RAT, and a downlink TCP data packet of an HTTP video application is transferred using a unlicensed band RAT.

An inner structure of a mobile communication network according to an embodiment of the present disclosure has been described with reference to FIG. 1, and a process of connecting a downlink bearer and a uplink bearer per traffic direction based on a traffic characteristic in an eNB in a mobile communication network according to an embodiment of the present disclosure will be described with reference to FIG. 2.

Figure 2:
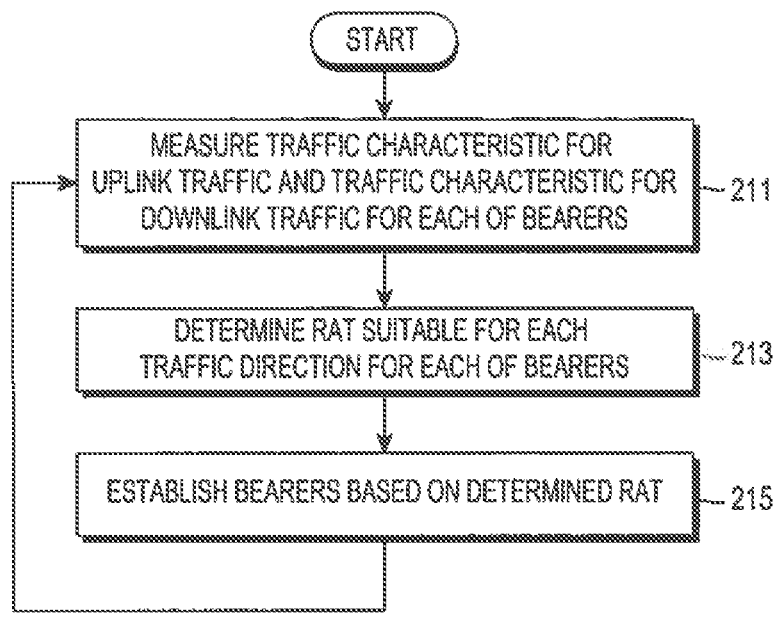
FIG. 2 schematically illustrates a process of connecting a downlink bearer and a uplink bearer per traffic direction based on a traffic characteristic in an eNB in a mobile communication network according to an embodiment of the present disclosure.

FIG. 2 schematically illustrates a process of connecting a downlink bearer and a uplink bearer per traffic direction based on a traffic characteristic in an eNB in a mobile communication network according to an embodiment of the present disclosure.

Referring to FIG. 2, an eNB measures a traffic characteristic for uplink traffic and a traffic characteristic for downlink traffic for each of bearers at operation 211, and proceeds to operation 213. Here, a traffic characteristic may include at least one of a packet size, time interval between packets (inter-frame spacing), a ratio of downlink traffic to uplink traffic, and/or the like.

The eNB determines an RAT suitable for each traffic direction for each of the established bearers based on at least one of the traffic characteristic measured at operation 211, a policy of a mobile communication service provider, and subscriber information at operation 213, and proceeds to operation 215. Here, a traffic direction includes a downlink and a uplink, so the eNB determines an RAT suitable for each of a downlink and a uplink for each of the established bearers based on at least one of the traffic characteristic measured at operation 211, the policy of the mobile communication service provider, and the subscriber information.

In an embodiment of the present disclosure, a scheme of determining an RAT suitable for a traffic direction based on a traffic characteristic may include, for example, a scheme #1 in which an eNB measures traffic to determine an RAT, a scheme #2 in which a mobile communication service provider determines an RAT corresponding to a traffic characteristic, and a scheme #3 in which a mobile communication service provider determines an RAT corresponding to a subscriber type. So, in an embodiment of the present disclosure, an RAT suitable for a traffic direction may be determined based on a traffic characteristic based on at least one of the scheme #1, the scheme #2, and the scheme #3.

The scheme #1, the scheme #2, and the scheme #3 will be described below, and a detailed description thereof will be omitted herein.

The eNB establishes bearers based on an RAT suitable for each of a downlink and a uplink for each of the bearers at operation 215.

Although FIG. 2 illustrates a process of connecting a downlink bearer and a uplink bearer per traffic direction based on a traffic characteristic in an eNB in a mobile communication network according to an embodiment of the present disclosure, various changes could be made to FIG. 2. For example, although shown as a series of operations, various operations in FIG. 2 could overlap, occur in parallel, occur in a different order, or occur multiple times.

A process of connecting a downlink bearer and a uplink bearer per traffic direction based on a traffic characteristic in an eNB in a mobile communication network according to an embodiment of the present disclosure has been described with reference to FIG. 2, and an example of a process of determining an RAT suitable for a traffic direction based on a traffic characteristic in an eNB in a mobile communication network according to an embodiment of the present disclosure will be described with reference to FIG. 3.

Figure 3:
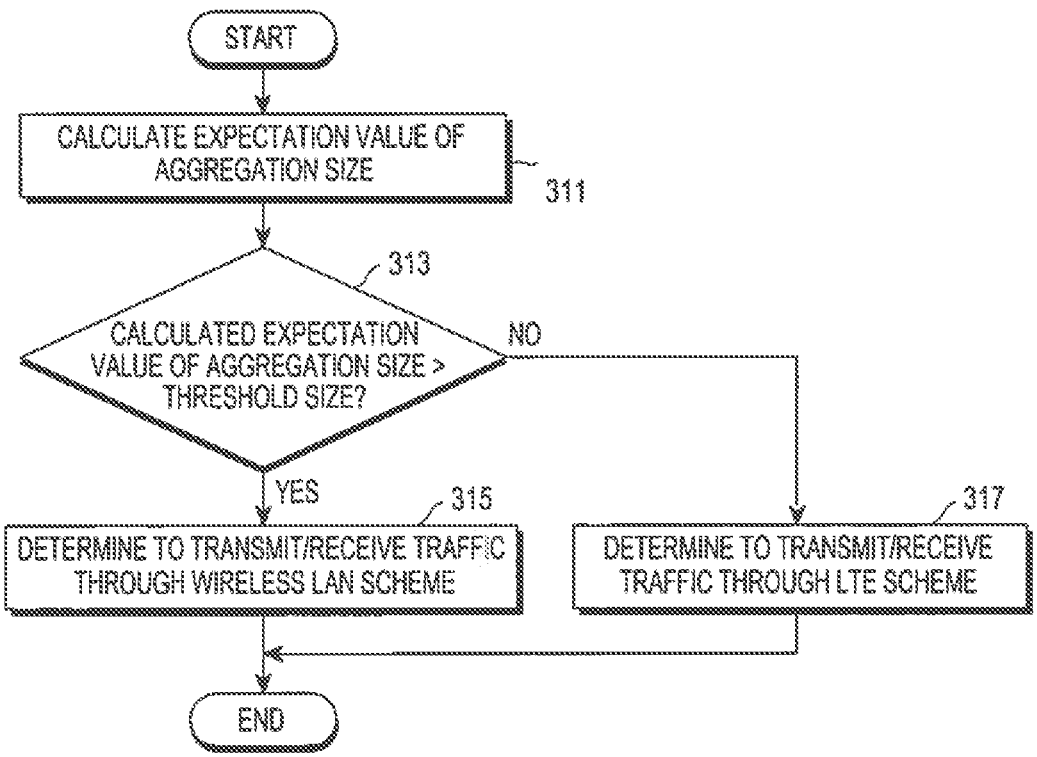
FIG. 3 schematically illustrates an example of a process of determining an RAT suitable for a traffic direction based on a traffic characteristic in an eNB in a mobile communication network according to an embodiment of the present disclosure.

FIG. 3 schematically illustrates an example of a process of determining an RAT suitable for a traffic direction based on a traffic characteristic in an eNB in a mobile communication network according to an embodiment of the present disclosure.

Referring to FIG. 3, an eNB calculates an expectation value of an aggregation size which is expected in a case of serving downlink (or uplink) traffic for a corresponding bearer through a preset RAT, e.g., a wireless LAN scheme at operation 311, and proceeds to operation 313. Here, the aggregation size denotes sum of packet sizes of packets which arrive in an eNB during preset time, and the aggregation size is a size which corresponds to a medium access control (MAC) protocol data unit (MPDU) aggregation (A-MPDU) size of an IEEE 802.11 protocol.

The eNB determines whether the expectation value of the calculated aggregation size is greater than a preset threshold size at operation 313. If the expectation value of the calculated aggregation size is greater than the preset threshold size, the eNB proceeds to operation 315. The eNB may expect that transmission efficiency will increase if an A-MPDU generated by aggregating a plurality of MPDUs to an MPDU of a preset size is transmitted when transmitting downlink (or uplink) traffic for the corresponding bearer through the wireless LAN at operation 315. So, the eNB determines that it is suitable for transmitting/receiving the downlink (or uplink) traffic for the corresponding bearer through the wireless LAN scheme at operation 315.

If the value of the calculated aggregation size is not greater than the preset threshold size, that is, if the value of the calculated aggregation size is less than or equal to the threshold size, the eNB proceeds to operation 317. The eNB expects that an A-MPDU of a sufficient size will not be generated when transmitting the downlink (or uplink) traffic for the corresponding bearer through the wireless LAN, and expects that transmission efficiency of a system will decrease at operation 317. So, the eNB determines that it is suitable for transmitting/receiving the downlink (or uplink) traffic for the corresponding bearer through other RAT, e.g., an LTE scheme, not the wireless LAN scheme at operation 317.

Although FIG. 3 illustrates an example of a process of determining an RAT suitable for a traffic direction based on a traffic characteristic in an eNB in a mobile communication network according to an embodiment of the present disclosure, various changes could be made to FIG. 3. For example, although shown as a series of operations, various operations in FIG. 3 could overlap, occur in parallel, occur in a different order, or occur multiple times.

An example of a process of determining an RAT suitable for a traffic direction based on a traffic characteristic in an eNB in a mobile communication network according to an embodiment of the present disclosure has been described with reference to FIG. 3, and another example of a process of determining an RAT suitable for a traffic direction based on a traffic characteristic in an eNB in a mobile communication network according to an embodiment of the present disclosure will be described with reference to FIG. 4.

Figure 4:
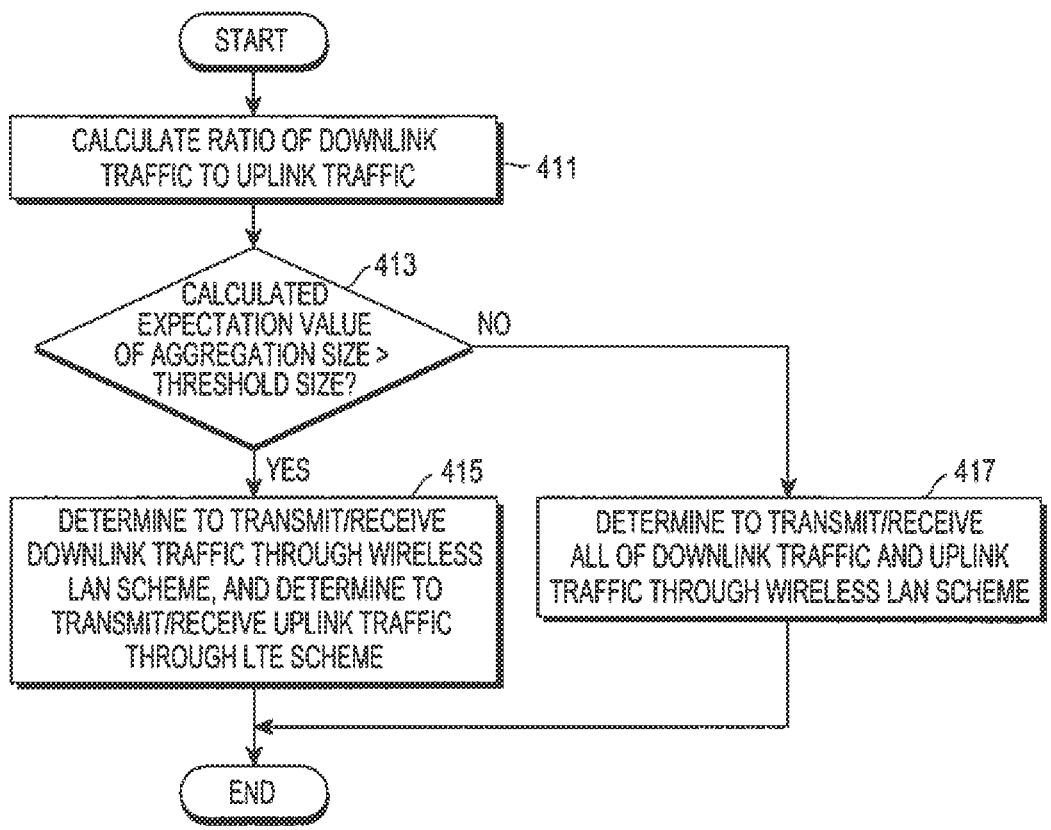
FIG. 4 schematically illustrates another example of a process of determining an RAT suitable for a traffic direction based on a traffic characteristic in an eNB in a mobile communication network according to an embodiment of the present disclosure.

FIG. 4 schematically illustrates another example of a process of determining an RAT suitable for a traffic direction based on a traffic characteristic in an eNB in a mobile communication network according to an embodiment of the present disclosure.

Referring to FIG. 4, an eNB calculates a ratio of downlink traffic to uplink traffic for a corresponding bearer at operation 411, and proceeds to operation 413. The eNB determines whether the calculated ratio of downlink traffic to uplink traffic is greater than a preset threshold ratio of downlink traffic to uplink traffic at operation 413. A case that the calculated ratio of downlink traffic to uplink traffic is greater than the threshold ratio of downlink traffic to uplink traffic may occur in a download-dominated application such as an HTTP video, an HTTP audio, software update, an Android Market, and/or the like. The download-dominated application denotes an application of which downlink traffic amount is relatively huge compared to uplink traffic amount, i.e., an application of which most traffic is download traffic.

If the calculated ratio of downlink traffic to uplink traffic is greater than the threshold ratio of downlink traffic to uplink traffic at operation 413, the eNB proceeds to operation 415. If the calculated ratio of downlink traffic to uplink traffic is greater than the threshold ratio of downlink traffic to uplink traffic, most of uplink traffic is a transmission control protocol (TCP) acknowledgement (ACK) packet, so the eNB determines that it is suitable for transmitting/receiving the downlink traffic for the corresponding bearer through a wireless LAN scheme and it is suitable for transmitting/receiving the uplink traffic for the corresponding bearer through an LTE scheme.

If the calculated ratio of downlink traffic to uplink traffic is not greater than the threshold ratio of downlink traffic to uplink traffic, that is, if the calculated ratio of downlink traffic to uplink traffic is less than or equal to the threshold ratio of downlink traffic to uplink traffic at operation 413, the eNB proceeds to operation 417. Because the calculated ratio of downlink traffic to uplink traffic is less than or equal to the threshold ratio of downlink traffic to uplink traffic, the eNB determines that traffic transmitted/received through the corresponding bearer is not a downlink-dominated application and determines that it is suitable for transmitting/receiving all of the downlink traffic and the uplink traffic for the corresponding bearer through the wireless LAN scheme at operation 417.

Although FIG. 4 illustrates another example of a process of determining an RAT suitable for a traffic direction based on a traffic characteristic in an eNB in a mobile communication network according to an embodiment of the present disclosure, various changes could be made to FIG. 4. For example, although shown as a series of operations, various operations in FIG. 4 could overlap, occur in parallel, occur in a different order, or occur multiple times.

Another example of a process of determining an RAT suitable for a traffic direction based on a traffic characteristic in an eNB in a mobile communication network according to an embodiment of the present disclosure has been described with reference to FIG. 4, and a process of determining an RAT suitable for a traffic direction based on a traffic characteristic in a mobile communication service provider in a mobile communication network according to an embodiment of the present disclosure will be described with reference to FIG. 5.

Figure 5:
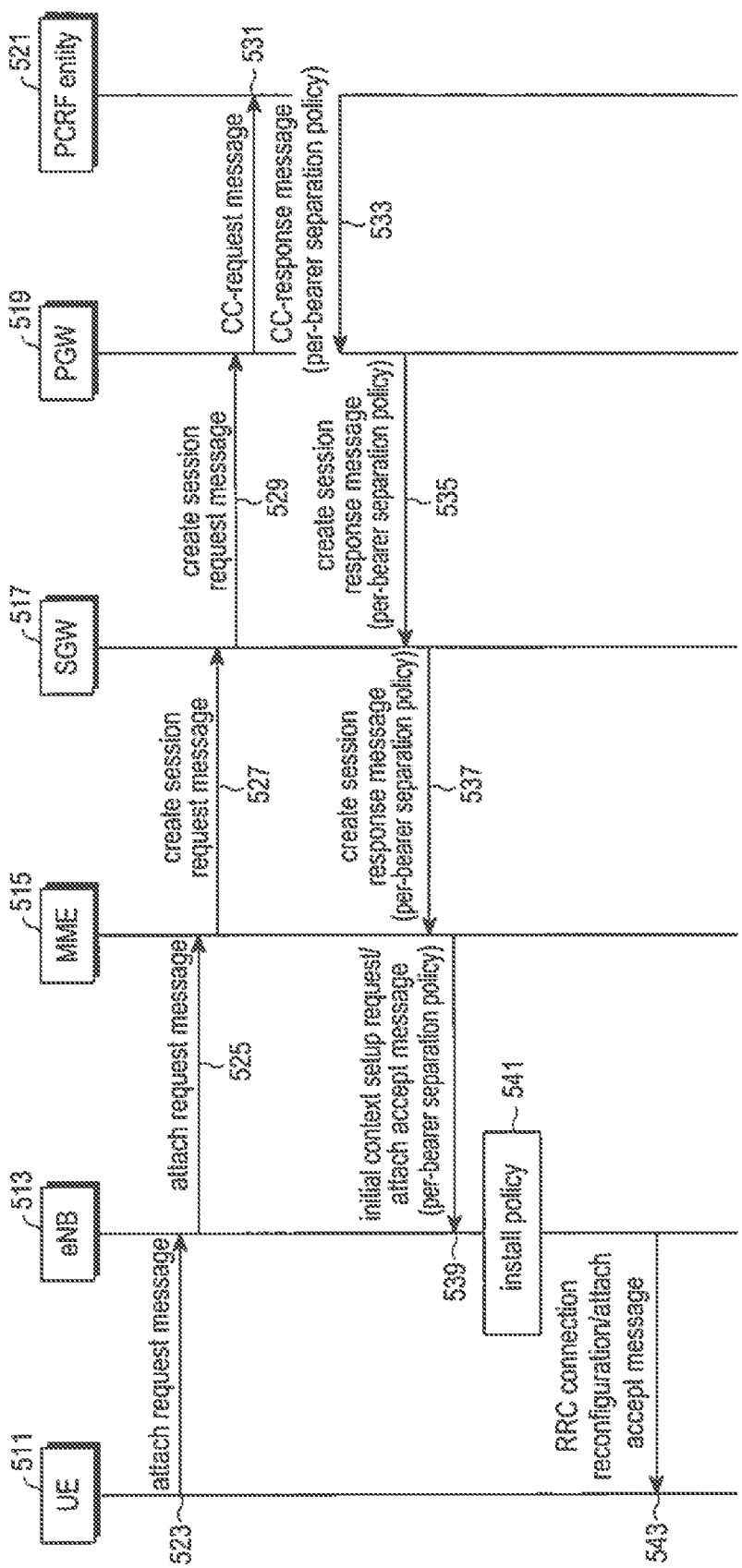
FIG. 5 schematically illustrates a process of determining an RAT suitable for a traffic direction based on a traffic characteristic in a mobile communication service provider in a mobile communication network according to an embodiment of the present disclosure.

FIG. 5 schematically illustrates a process of determining an RAT suitable for a traffic direction based on a traffic characteristic in a mobile communication service provider in a mobile communication network according to an embodiment of the present disclosure.

Referring to FIG. 5, the mobile communication network includes a UE 511, an eNB 513, a mobility management entity (MME) 515, an SGW 517, a PGW 519, and a policy and charging rules function (PCRF) entity 521.

Firstly, the PCRF entity 521 may be included in a mobile communication service provider, and the PCRF entity 521 analyzes a traffic pattern for a specific service through a pre-investigation and then may predetermine a policy for an RAT suitable for a traffic direction (uplink or downlink) of the specific service. For example, in a uplink for a downlink-dominated application such as an HTTP video, an HTTP audio, software update, Android Market, and/or the like, if a signal is transmitted/received through a wireless LAN scheme, system efficiency may decrease, so the mobile communication service provider may predetermine a policy such that a signal is always transmitted/received through an LTE scheme in the uplink for the downlink-dominated application.

The PCRF entity 521 manages a filtering criterion which makes each of IP flows to be allocated to a specific bearer. So, the PCRF entity 521 determines that the downlink-dominated application is transmitted/received through the specific bearer using the filtering criterion and may determine a policy in which a signal may not be transmitted/received through the wireless LAN scheme for the uplink for the specific bearer.

The PCRF entity 521 may predetermine a policy for an RAT suitable for a traffic direction (uplink or downlink) for a service which has a specific characteristic through a pre-investigation. For example, in a case of financial services such as mobile finance, mobile stock trading, or electronic commerce, a signal which requires a relatively high reliability or a relatively high security such as personal information, a password, credit information, and/or the like of a user may be transmitted through a uplink according to a characteristic of a service. So, in the uplink for the traffic such as the financial services such as the mobile finance, mobile stock trading, or the electronic commerce, relatively high reliability or relatively high security may be guaranteed by transmitting/receiving a signal using an LTE scheme rather than a wireless LAN scheme.

So, the PCRF entity 521 makes the financial services to be served through a specific bearer using a filtering criterion which makes a specific IP flow to be allocated to a specific bearer, and may determine a policy in which a signal is transmitted/received using an LTE scheme in a uplink for the specific corresponding bearer.

Upon detecting that there is a need for attach request, the UE 511 transmits an attach request message to the eNB 513 (at operation 523). After receiving the attach request message from the UE 511, the eNB 513 transmits an attach request message to the MME 515 (at operation 525).

After receiving the attach request message from the eNB 513, the MME 515 detects that a new session needs to be generated, and transmits a create session request message to the SGW 517 (at operation 527). After receiving the create session request message from the MME 515, the SGW 517 transmits a create session request message to the PGW 519 (at operation 529).

After receiving the create session request message from the SGW 517, the PGW 519 transmits a credit control (CC)-request message to the PCRF entity 521 (at operation 531).

After receiving the CC-request message from the PGW 519, the PCRF entity 521 determines a per-bearer separation policy as a policy for an RAT suitable for each traffic direction for a corresponding bearer. Here, the per-bearer separation policy may include, for example, at least one of a bearer identifier (ID), uplink optimal RAT information indicating an RAT which is optimal for a uplink, downlink optimal RAT information indicating an RAT which is optimal for a downlink, uplink unsuitable RAT information indicating an RAT which is unsuitable for a uplink, and downlink unsuitable RAT information indicating an RAT which is unsuitable for a downlink.

The PCRF entity 521 includes the determined per-bearer separation policy into a CC-response message as a response message to the CC-request message and transmits the CC-response message to the PGW 519 (at operation 533).

After receiving the CC-response message from the PCRF entity 521, the PGW 519 transmits a create session response message including a per-bearer separation policy to the SGW 517 (at operation 535). After receiving the create session response message from the PGW 519, the SGW 517 transmits a create session response message including a per-bearer separation policy to the MME 515 (at operation 537).

After receiving the create session response message from the SGW 517, the MME 515 transmits an initial context setup request/attach accept message including a per-bearer separation policy (at operation 539). After receiving the initial context setup request/attach accept message from the MME 515, the eNB 513 may determine an RAT suitable per traffic direction for a corresponding bearer based on the per-bearer separation policy included in the initial context setup request/attach accept message, and may determine a policy for the corresponding bearer based on this determined result. The eNB 513 installs the determined policy (at operation 541), and transmits a radio resource control (RRC) connection reconfiguration/attach accept message to the UE 511 (at operation 543).

Meanwhile, a case that the eNB 513 determines a policy for the bearer generated when the UE 511 attaches and installs the determined policy has been described in FIG. 5, however, a process as described in FIG. 5 may be applied to messages transferred from the PCRF entity 521 to the eNB 513 in various cases such as a case that a dedicated bearer is activated by other entity, a case that bearer update occurs, and/or the like.

Although FIG. 5 illustrates a process of determining an RAT suitable for a traffic direction based on a traffic characteristic in a mobile communication service provider in a mobile communication network according to an embodiment of the present disclosure, various changes could be made to FIG. 5. For example, although shown as a series of operations, various operations in FIG. 5 could overlap, occur in parallel, occur in a different order, or occur multiple times.

A process of determining an RAT suitable for a traffic direction based on a traffic characteristic in a mobile communication service provider in a mobile communication network according to an embodiment of the present disclosure has been described with reference to FIG. 5, and a process of determining an RAT suitable for a traffic direction based on a subscriber type in a mobile communication service provider in a mobile communication network according to an embodiment of the present disclosure will be described with reference to FIG. 6.

Figure 6:
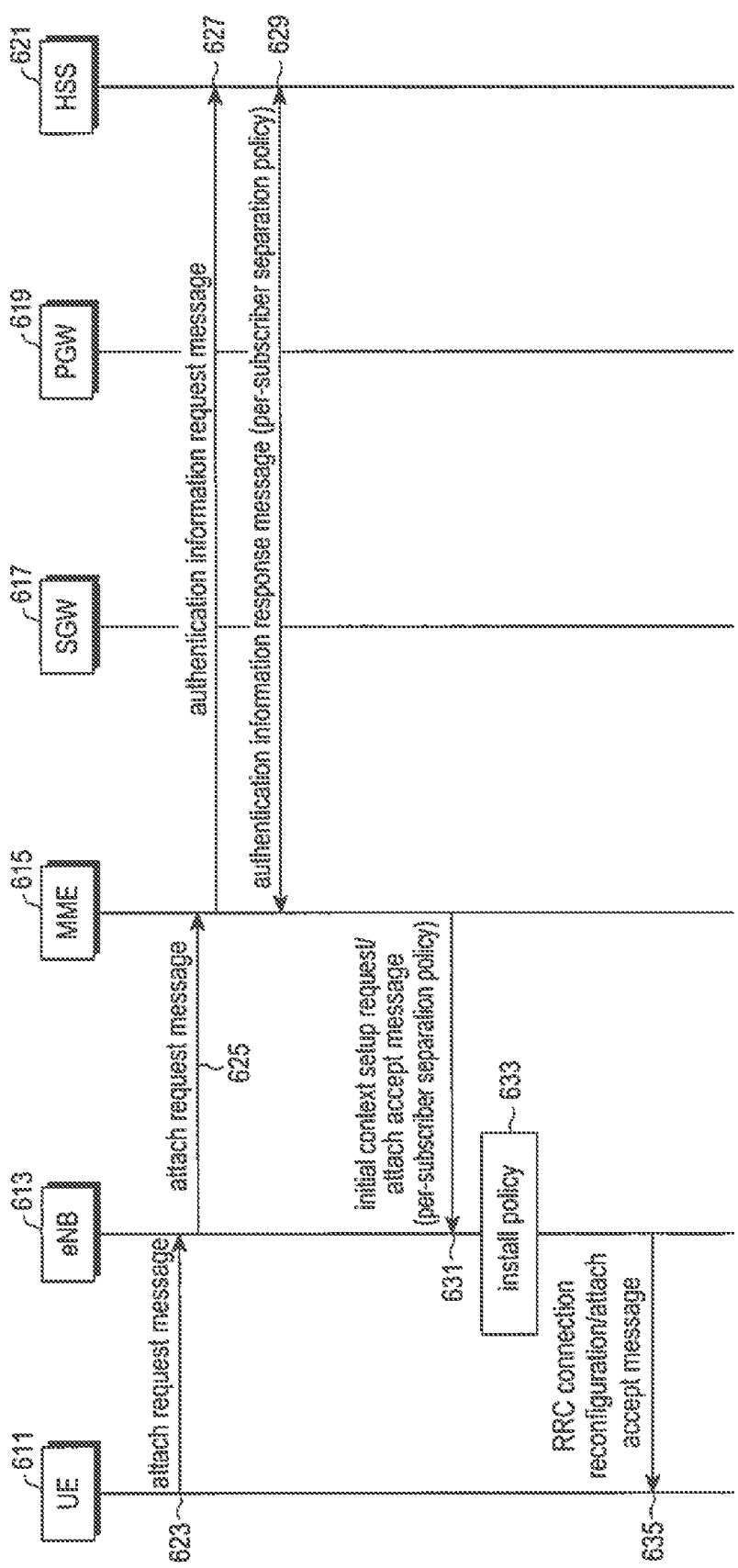
FIG. 6 schematically illustrates a process of determining an RAT suitable for a traffic direction based on a subscriber type in a mobile communication service provider in a mobile communication network according to an embodiment of the present disclosure.

FIG. 6 schematically illustrates a process of determining an RAT suitable for a traffic direction based on a subscriber type in a mobile communication service provider in a mobile communication network according to an embodiment of the present disclosure.

Referring to FIG. 6, the mobile communication network includes a UE 611, an eNB 613, an MME 615, an SGW 617, a PGW 619, and a home subscriber server (HSS) 621.

Upon detecting that there is a need for attach request, the UE 611 transmits an attach request message to the eNB 613 (at operation 623). After receiving the attach request message from the UE 611, the eNB 613 transmits an attach request message to the MME 615 (at operation 625).

After receiving the attach request message from the eNB 613, the MME 615 transmits an authentication information request message to the HSS 621 (at operation 627).

After receiving the authentication information request message from the MME 615, the HSS 621 determines a per-subscriber separation policy as a policy for an RAT which is suitable for a traffic direction, i.e., downlink traffic and uplink traffic for a corresponding bearer based on subscriber information for the UE 611. Here, the per-bearer separation policy may include, for example, at least one of a subscriber ID, uplink optimal RAT information indicating an RAT which is optimal for a uplink, downlink optimal RAT information indicating an RAT which is optimal for a downlink, uplink unsuitable RAT information indicating an RAT which is unsuitable for a uplink, and downlink unsuitable RAT information indicating an RAT which is unsuitable for a downlink.

The HSS 621 includes the detected per-subscriber separation policy into an authentication information response message as a response message to the authentication information request message, and transmits the authentication information response message to the MME 615 (at operation 629).

After receiving the authentication information response message from the HSS 621, the MME 615 transmits an initial context setup request/attach accept message including a per-subscriber separation policy to the eNB 613 (at operation 631). After receiving the initial context setup request/attach accept message from the MME 615, the eNB 613 may determine an RAT suitable per traffic direction for a corresponding bearer based on the per-bearer separation policy included in the initial context setup request/attach accept message, and may determine a policy for the corresponding bearer based on this determined result. The eNB 613 installs the determined policy (at operation 633) and transmits an RRC connection reconfiguration/attach accept message to the UE 611 (at operation 635).

Although FIG. 6 illustrates a process of determining an RAT suitable for a traffic direction based on a subscriber type in a mobile communication service provider in a mobile communication network according to an embodiment of the present disclosure, various changes could be made to FIG. 6. For example, although shown as a series of operations, various operations in FIG. 6 could overlap, occur in parallel, occur in a different order, or occur multiple times.

A process of determining an RAT suitable for a traffic direction based on a subscriber type in a mobile communication service provider in a mobile communication network according to an embodiment of the present disclosure has been described with reference to FIG. 6, and an example of a structure of a bearer in a mobile communication network according to an embodiment of the present disclosure will be described with reference to FIG. 7.

Figure 7:
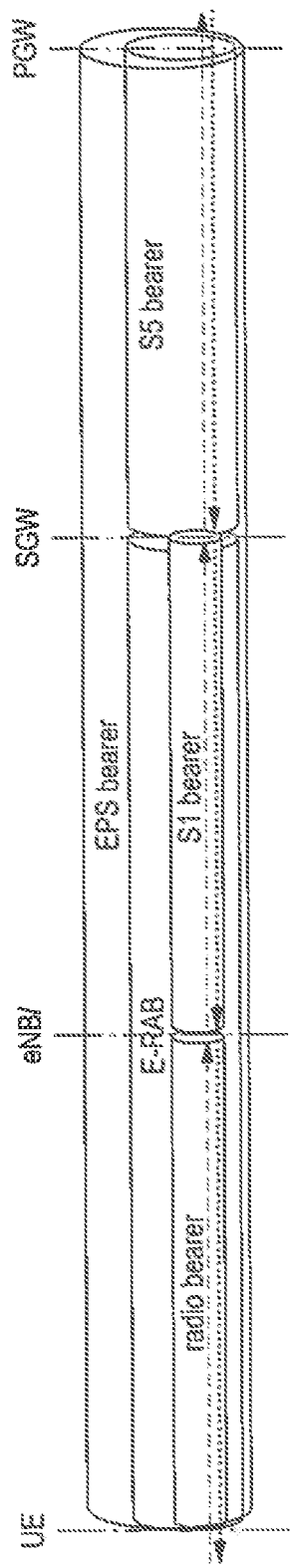
FIG. 7 schematically illustrates an example of a structure of a bearer in a mobile communication network according to an embodiment of the present disclosure.

FIG. 7 schematically illustrates an example of a structure of a bearer in a mobile communication network according to an embodiment of the present disclosure.

Prior to a description of FIG. 7, it will be noted that a bearer structure as show in FIG. 7 is a bearer structure in a case of the mobile communication network is an LTE mobile communication system.

An LTE mobile communication system defines various bearer services for guaranteeing a QoS of a preset level for an end-to-end service between corresponding entities, e.g., a UE and a video streaming server as the other party of the UE. The end-to-end service is provided in various intervals such as an evolved universal terrestrial access network (E-UTRAN), an evolved packet core (EPC), and/or the like through various network entities in the LTE mobile communication system.

Further, a data transmission service is provided through an EPS bearer, and the EPS bearer is a basic unit by which a QoS is applied in an LTE system. The EPS bearer is classified into an evolved radio access bearer (E-RAB) and an S5 bearer, and the E-RAB is classified into a radio bearer and an S1 bearer.

A radio bearer is used between a UE and an eNB, and an S1 bearer is used between the eNB and the SGW. Further, an S5 bearer is used between the SGW and the PGW. At this time, the EPS bearer, the E-RAB, and the S5 bearer are mapped one to one, and the E-RAB, the radio bearer, and the S1 bearer are also mapped one to one.

An example of a structure of a bearer in a mobile communication network according to an embodiment of the present disclosure has been described with reference to FIG. 7, and another example of a structure of a bearer in a mobile communication network according to an embodiment of the present disclosure will be described with reference to FIG. 8.

Figure 8:
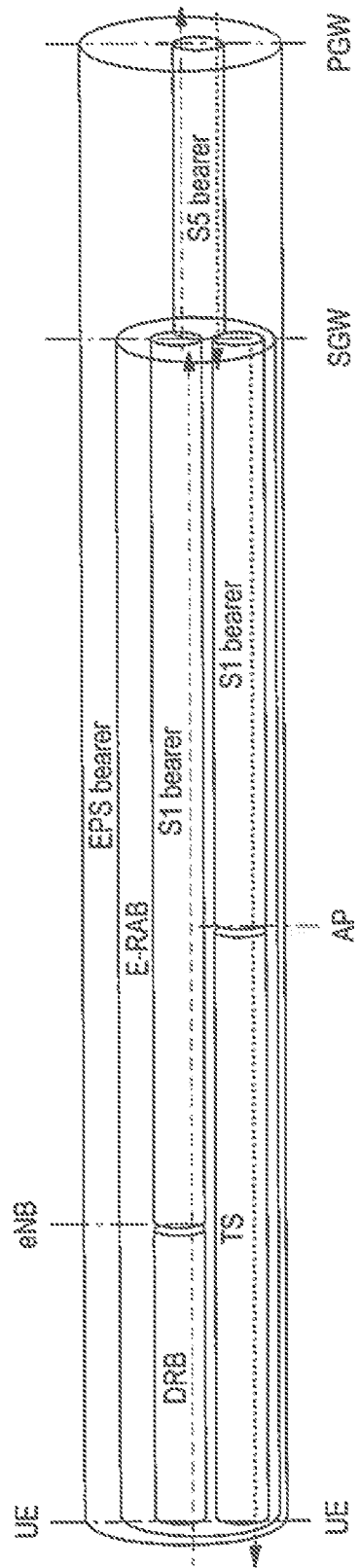
FIG. 8 schematically illustrates another example of a structure of a bearer in a mobile communication network according to an embodiment of the present disclosure.

FIG. 8 schematically illustrates another example of a structure of a bearer in a mobile communication network according to an embodiment of the present disclosure.

Prior to a description of FIG. 8, it will be noted that a bearer structure as show in FIG. 8 is a bearer structure in a case of the mobile communication network is an LTE mobile communication system.

Referring to FIG. 8, a bearer structure as shown in FIG. 8 maintains an EPS bearer included in a bearer structure as shown in FIG. 7, and further includes an S1 bearer and radio bearer.

That is, the EPS bearer, an E-RAB, an S5 bearer are mapped one to one, and the E-RAB, a radio bearer, and the S1 bearer are mapped one to one.

That is, one-to-one mapping relation between the EPS bearer and the S5 bearer is maintained, however, a data radio bearer (DRB) which corresponds to an E-RAB region and an S1 bearer are additionally generated, a uplink IP flow is mapped onto an existing radio bearer and an S1 bearer which are connected to an LTE mobile communication system, and a downlink IP flow is mapped onto a new data radio bearer and an S1 bearer which are connected to a wireless LAN.

So, unlike a bearer structure as shown in FIG. 7 in which an EPS bearer, a radio bearer, and an S1 bearer are managed at a ratio of 1:1, an EPS bearer, a radio bearer, and an S1 bearer are managed at a ratio of 1:2 in a bearer structure as shown in FIG. 8.

Another example of a structure of a bearer in a mobile communication network according to an embodiment of the present disclosure has been described with reference to FIG. 8, and a process of a connecting a bearer in a mobile communication network which follows a structure of a bearer in FIG. 8 will be described with reference to FIGS. 9a and 9b.

Figure 9A:
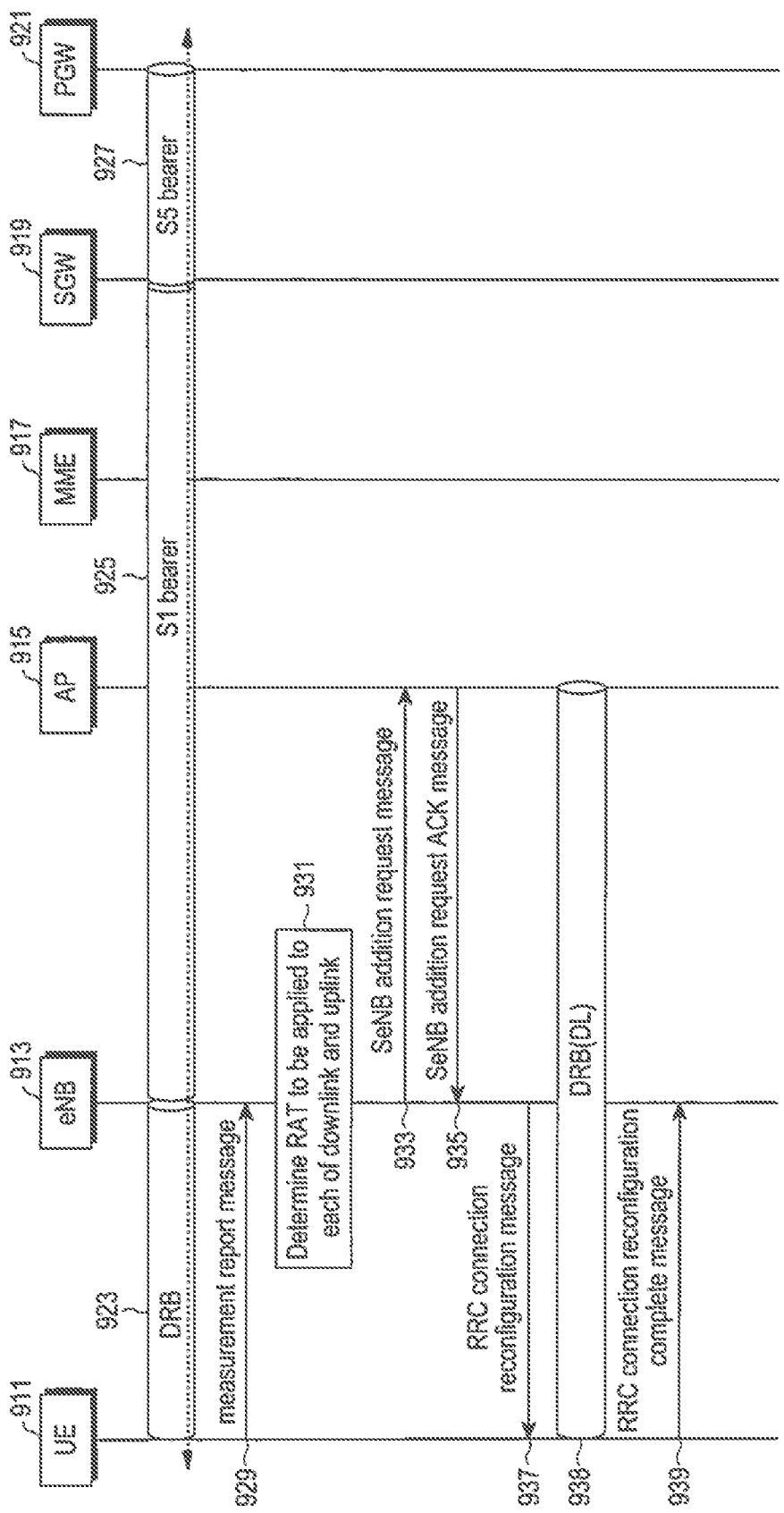
FIGS. 9a and 9b schematically illustrate a process of a connecting a bearer in a mobile communication network which follows a structure of a bearer in FIG. 8.
Figure 9B:
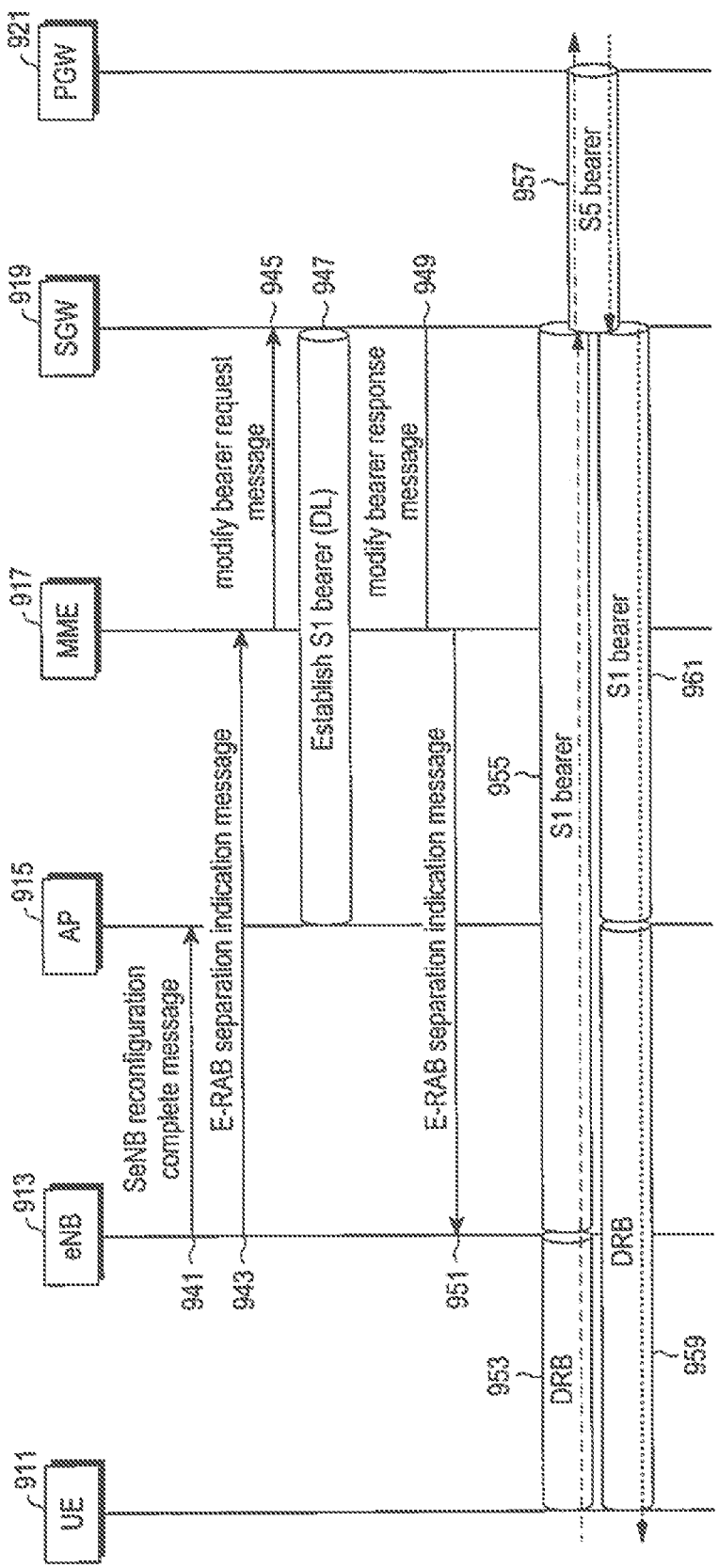

FIGS. 9a and 9b schematically illustrate a process of a connecting a bearer in a mobile communication network which follows a structure of a bearer in FIG. 8.

Referring to FIGS. 9a and 9b, the mobile communication network includes a UE 911, an eNB 913, an AP 915, an MME 917, an SGW 919, and a PGW 921.

Firstly, it will be assumed that a data radio bearer is established between the UE 911 and the eNB 913 (923), an S1 bearer is established between the eNB 913 and the SGW 919 (925), and an S5 bearer is established between the SGW 919 and the PGW 921 (927).

The UE 911 transmits a measurement report message to the eNB 913 (at operation 929). The measurement report message includes measurement result for each of neighbor cells which is measured in the UE 911. Here, the measurement result for each of the neighbor cells may be channel quality information which is measured in the UE 911 based on a reference signal transmitted from each of the neighbor cells, for example, one of various metrics such as received signal code power (RSCP), reference signal received power (RSRP), a reference signal strength indicator (RSSI), reference signal received quality (RSRQ), a carrier-to-interference ratio (CINR), a signal-to-noise ratio (SNR), a block error rate (BLER), and/or the like.

After receiving the measurement report message from the UE 911, the eNB 913 determines an RAT to be applied to each of a downlink and a uplink of a bearer established with the UE 911 (at operation 931) based on the received measurement report message. An operation of determining whether to apply a different RAT to each of the downlink and the uplink of the bearer established with the UE 911 in the eNB 913 has been described with at operation 213 in FIG. 2, and a detailed description thereof will be omitted herein. It will be assumed that the eNB 913 determines to apply a wireless LAN scheme to the downlink and to apply an LTE scheme to the uplink.

The eNB 913 transmits a Secondary eNB (SeNB) addition request message to the AP 915 (at operation 933). The SeNB addition request message may include a plurality of parameters, e.g., SeNB UE aggregate maximum bit rate (AMBR), E-RABs To Be Added List {E-RAB ID, E-RAB Level DL QoS Parameter}, and/or the like. The E-RABs To Be Added List indicates a list of E-RABs to be added, and includes an E-RAB ID and an E-RAB Level DL QoS Parameter of a corresponding E-RAB.

After receiving the SeNB addition request message from the eNB 913, the AP 915 performs an admission control process by considering traffic status of UEs to which the AP 915 provides a service, an available channel of a unlicensed band, and/or the like based on the SeNB addition request message, and transmits an SeNB addition request ACK message including a result for the admission control process to the eNB 913 (at operation 935). Here, the SeNB addition request ACK message includes E-RABs Admitted To Be Added List, E-RABs Not Admitted List, and an downlink data bearer ID (DL DRB ID) as an ID for a downlink data bearer which the UE 911 will use if a wireless LAN scheme is applied.

After receiving the SeNB addition request ACK message from the AP 915, the eNB 913 transmits an RRC connection reconfiguration message to the UE 911 (at operation 937). The RRC connection reconfiguration message includes an EPS bearer ID, a UL LTE DRB ID, and a DL WLAN DRB ID. The RRC connection reconfiguration message is used for the eNB 913 to instruct the UE 911 to transmit a uplink IP flow which corresponds to an EPS bearer ID which has been already set to the UE 911 through a data radio bearer with a UL LTE DRB ID and to transmit a downlink IP flow which corresponds to the EPS bearer ID through a data radio bearer with a DL WLAN DRB ID.

After receiving the RRC connection reconfiguration message from the eNB 913, the UE 911 generates a new data radio bearer with the AP 915 based on the RRC connection reconfiguration message and sets an RAT to be used in traffic which corresponds to a downlink IP flow and traffic which corresponds to a uplink IP flow which correspond to the EPS bearer ID (at operation 938). The UE 911 transmits an RRC connection reconfiguration complete message as a response message to the RRC connection reconfiguration message to the eNB 913 (at operation 939).

After receiving the RRC connection reconfiguration complete message from the UE 911, the eNB 913 transmits an SeNB reconfiguration complete message to the AP 915 (at operation 941). The SeNB reconfiguration complete message has a function of notifying the AP 915 that connection reconfiguration of the UE 911 has been successfully completed, and may also include connection reconfiguration setting information of the UE 911.

The eNB 913 transmits an E-RAB separation indication message to the MME 917 (at operation 943). The E-RAB separation indication message may information about an E-RAB in which a uplink and a downlink to which different RATs are applied are transmitted, e.g., an E-RAB ID, a transport layer address, and a DL GPRS tunneling protocol (GTP) tunnel endpoint ID (TEID). That is, the E-RAB separation indication message may include E-RAB to be separated {E-RAB ID, transport layer address, DL GTP TEID}, and E-RAB not to be modified {E-RAB ID, transport layer address, DL GTP TEID}. Finally, the E-RAB separation indication message indicates that the SGW 919 will generate a new downlink S1 bearer through the AP 915, transfer a downlink IP flow through the newly generated downlink S1 bearer, and receive a uplink IP flow through an existing S1 bearer. Here, it will be noted that the E-RAB separation indication message may include parameters of the same format with an E-RAB modification indication message defined in a 3GPP dual connectivity standard, however, the E-RAB modification indication message may be different in an aspect that an existing E-RAB which passes an LTE mobile communication system is removed, and a uplink IP flow and a downlink IP flow are transferred through a newly generated E-RAB.

After receiving the E-RAB separation indication message from the eNB 913, the MME 917 transmits a modify bearer request message to the SGW 919 (at operation 945). The modify bearer request message may include bearer context to be modified (EPS bearer ID, S1 AP F-TEID (Fully Qualified Tunnel Endpoint Identifier)). After receiving the modify bearer request message from the MME 917, the SGW 919 generates a downlink S1 bearer which passes the AP 915 based on the E-RAB information included in the modify bearer request message, and transmits a downlink IP flow which is set to pass an S1 bearer set to pass the eNB 913 through the downlink S1 bearer which passes the AP 915 (at operation 947).

The SGW 919 transmits a modify bearer response message as a response message to the modify bearer request message to the MME 917 (at operation 949). The modify bearer response message include bearer contexts modified {EPS bearer ID}. After receiving the modify bearer response message from the SGW 919, the MME 917 transmits an E-RAB separation indication message to the eNB 913 (at operation 951). Here, the E-RAB separation indication message may include E-RAB modify list {E-RAB ID}.

After receiving the E-RAB separation indication message from the MME 917, the eNB 913 may detect that a uplink and downlink separating operation has been successfully performed, so the eNB 913 maintains and uses an existing S1 bearer and data radio bearer for transferring a uplink IP flow to the SGW 919 (at operations 953, 955, 957, 959, and 961).

Although FIGS. 9a and 9b illustrate a process of a connecting a bearer in a mobile communication network which follows a structure of a bearer in FIG. 8, various changes could be made to FIGS. 9a and 9b. For example, although shown as a series of operations, various operations in FIGS. 9a and 9b could overlap, occur in parallel, occur in a different order, or occur multiple times.

A process of a connecting a bearer in a mobile communication network which follows a structure of a bearer in FIG. 8 has been described with reference to FIGS. 9a and 9b, and still another example of a structure of a bearer in a mobile communication network according to an embodiment of the present disclosure will be described with reference to FIG. 10.

Figure 10:
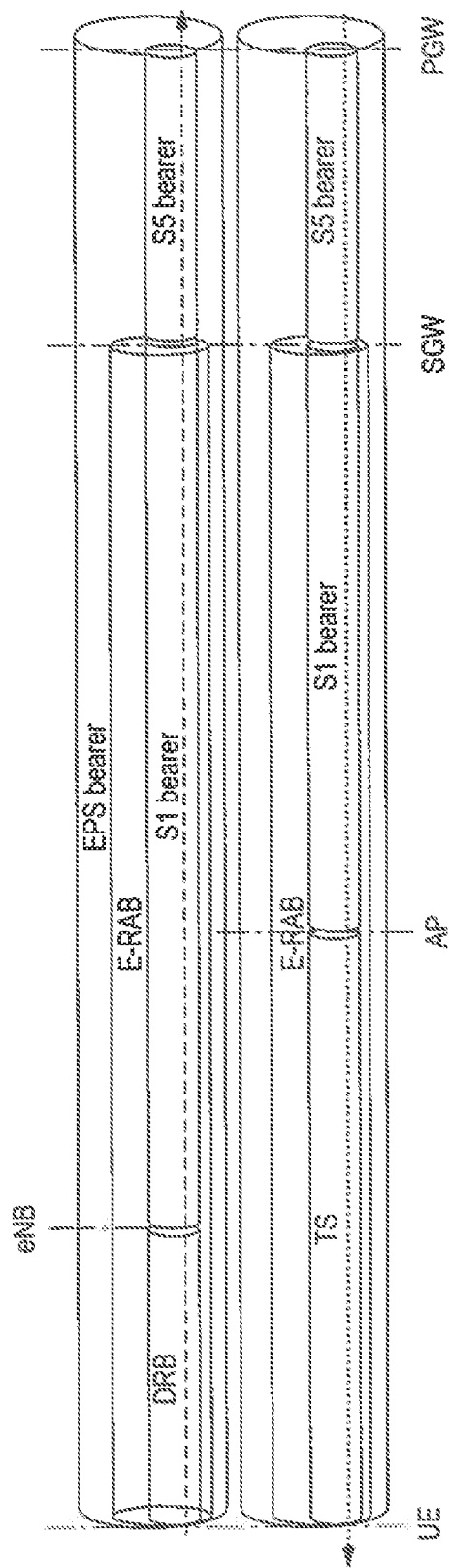
FIG. 10 schematically illustrates still another example of a structure of a bearer in a mobile communication network according to an embodiment of the present disclosure.

FIG. 10 schematically illustrates still another example of a structure of a bearer in a mobile communication network according to an embodiment of the present disclosure.

Referring to FIG. 10, a bearer structure in a mobile communication network as show in FIG. 10 includes a bearer structure in a mobile communication network as show in FIG. 7 and an EPS bearer which passes an AP which uses a wireless LAN scheme.

So, an existing EPS bearer which manages all of a uplink IP flow and a downlink IP flow and passes an LTE mobile communication system passes only a uplink IP flow, and a downlink IP flow is mapped to a new EPS bearer. So, the bearer structure in the mobile communication network as show in FIG. 10 has a characteristic that a bearer structure of an existing LTE mobile communication system in which an EPS bearer and lower bearers are managed one to one is maintained.

Still another example of a structure of a bearer in a mobile communication network according to an embodiment of the present disclosure has been described with reference to FIG. 10, and a process of connecting a bearer in a mobile communication network which follows a structure of a bearer in FIG. 10 will be described with reference to FIGS. 11a and 11b.

Figure 11A:
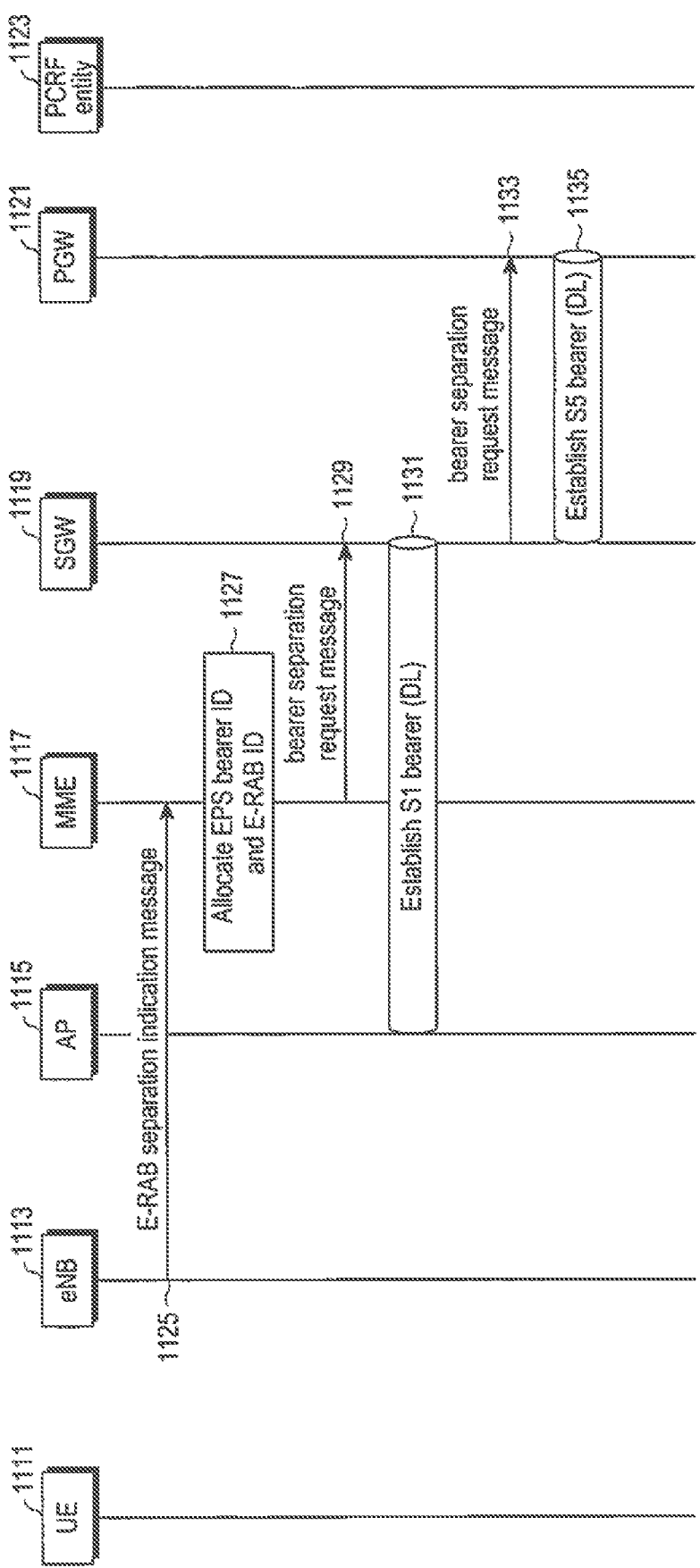
FIGS. 11a and 11b schematically illustrate a process of a connecting a bearer in a mobile communication network which follows a structure of a bearer in FIG. 10.
Figure 11B:
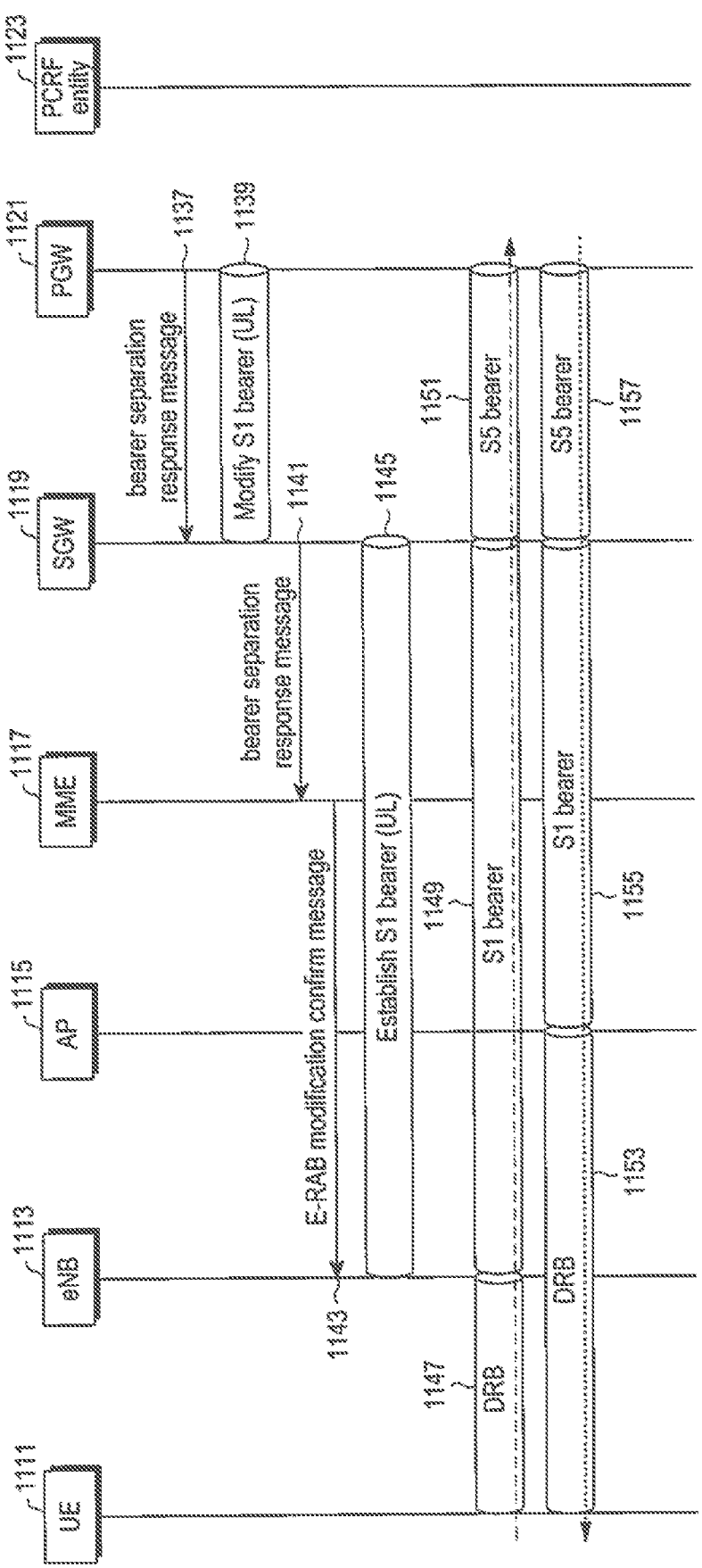

FIGS. 11a and 11b schematically illustrate a process of a connecting a bearer in a mobile communication network which follows a structure of a bearer in FIG. 10.

Referring to FIGS. 11a and 11b, the mobile communication network includes a UE 1111, an eNB 1113, an AP 1115, an MME 1117, an SGW 1119, a PGW 1121, and a PCRF entity 1123.

It will be noted that a process of connecting a bear in a mobile communication network in FIGS. 11a and 11b is a process of connecting a bear after a process identical to a process from operations 923 to 939 in FIG. 9a has been completed.

So, the eNB 1113 transmits an E-RAB separation indication message to the MME 1117 (at operation 1125). That is, the eNB 1113 starts a process of using an EPS bearer which corresponds to an E-RAB which is set to pass the eNB 1113 which currently uses an LTE scheme for a uplink and newly generating an EPS bearer which passes the AP 1115 which uses a wireless LAN scheme to use the newly generated EPS bearer for a downlink by transmitting the E-RAB separation indication message to the MME 1117. The E-RAB separation indication message may include E-RAB to be separated {E-RAB ID, transport layer address, DL GTP TEID} and E-RAB not to be modified {E-RAB ID, transport layer address, DL GTP TEID}.

After receiving the E-RAB separation indication message from the eNB 1113, the MME 1117 newly allocates an EPS bearer ID for an EPS bearer to be newly generated for downlink transmission and an E-RAB ID for an E-RAB (at operation 1127). The MME 1117 transmits a bearer separation request message to the SGW 1119 (at operation 1129). The bearer separation request message may include an IMSI, an RAT type, an APN, a DL bearer context to be created {EPS bearer ID, S1 AP F-TEID, QoS}, and a UL bearer context to be modified {EPS bearer ID, QoS}. That is, the bearer separation request message includes DL bearer context to be created as information for a downlink bearer to be newly generated after passing the AP 1115 which uses the wireless LAN scheme, and UL bearer context to be modified as information of a bearer which is set to pass the eNB 1113 which uses the LTE scheme, but will be changed to use for only a uplink.

After receiving the bearer separation request message from the MME 1117, the SGW 1119 may generate a downlink S1 bearer between the AP 1115 and the SGW 1119 based on information included in the bearer separation request message (at operation 1131).

The SGW 1119 transmits a bearer separation request message to the PGW 1121 (at operation 1133). The bearer separation request message may include an IMSI, an RAT type, an APN, a DL bearer context to be created {EPS bearer ID, S5 SGW F-TEID, QoS}, and UL bearer context to be modified {EPS bearer ID, QoS}. That is, the bearer separation request message includes information for a downlink bearer to be newly generated to pass the AP 1115 which uses the wireless LAN scheme, and information of a bearer which has been generated to pass the eNB 1113 which uses the LTE scheme, but will be changed to use for only a uplink.

After receiving the bearer separation request message from the SGW 1119, the PGW 1121 may generate a downlink S5 bearer between the SGW 1119 and the PGW 1121 based on information included in the bearer separation request message (at operation 1135).

The PGW 1121 transmits a bearer separation response message as a response message to the bearer separation request message to the SGW 1119 (at operation 1137). The bearer separation response message may include a DL bearer context created {EPS bearer ID, QoS}, a UL bearer context modified {EPS bearer ID, QoS}, and a UL TFT. According that the SGW 1119 receives the bearer separation response message from the POW 1121, a uplink S5 bearer between the SGW 1119 and the PGW 1121 is modified (at operation 1139). That is, if a bearer which has been generated to pass the eNB 1113 is a guaranteed bit rate (GBR) bearer in a form of guaranteeing a specific resource, the SGW 1119 which receives the bearer separation response message may set the bearer which has been generated as a uplink dedicated bearer by releasing a resource for downlink traffic of a corresponding bearer.

The SGW 1119 transmits a bearer separation response message to the MME 1117 (at operation 1141). The bearer separation response message may include a DL bearer context created {EPS bearer ID, QoS}, a UL bearer context modified {EPS bearer ID, QoS}, and a UL TFT. After receiving the bearer separation response message from the SGW 1119, the MME 1117 transmits an E-RAB modification confirm message to the eNB 1113 (at operation 1143). The E-RAB modification confirm message may include an MME UE S1 AP ID, an eNB UE S1 AP ID, and an E-RAB modify list {E-RAB ID}.

If a bearer which has been generated to pass the eNB 1113 is a GBR bearer in a form of guaranteeing a specific resource, the SGW 1119 which receives the E-RAB modification confirm message from the MME 1117, the eNB 1113 releases a resource for downlink traffic of a corresponding bearer to set an existing bearer as a uplink dedicated bearer (at operation 1145).

Although FIGS. 11a and 11b illustrate a process of a connecting a bearer in a mobile communication network which follows a structure of a bearer in FIG. 10, various changes could be made to FIGS. 11a and 11b. For example, although shown as a series of operations, various operations in FIGS. 11a and 11b could overlap, occur in parallel, occur in a different order, or occur multiple times.

A process of a connecting a bearer in a mobile communication network which follows a structure of a bearer in FIG. 10 has been described with reference to FIGS. 11a and 11b, and an inner structure of a UE in a mobile communication network according to an embodiment of the present disclosure will be described with reference to FIG. 12.

Figure 12:
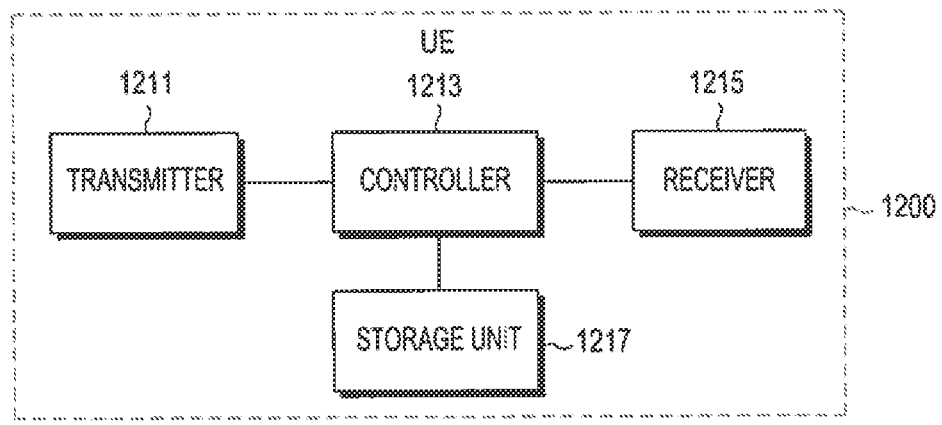
FIG. 12 schematically illustrates an inner structure of a UE in a mobile communication network according to an embodiment of the present disclosure.

FIG. 12 schematically illustrates an inner structure of a UE in a mobile communication network according to an embodiment of the present disclosure.

Referring to FIG. 12, a UE 1200 includes a transmitter 1211, a controller 1213, a receiver 1215, and a storage unit 1217.

The controller 1213 controls the overall operation of the UE 1200, and more particularly, controls an operation related to an operation of transmitting/receiving a signal based on a traffic characteristic in a mobile communication network according to an embodiment of the present disclosure. The operation related to the operation of transmitting/receiving the signal based on the traffic characteristic in the mobile communication network according to an embodiment of the present disclosure has been described with reference to FIGS. 1 to 11, and a detailed description thereof will be omitted herein.

The transmitter 1211 transmits various signals and various messages to other entities included in the mobile communication network under a control of the controller 1213. The various signals and the various messages transmitted by the transmitter 1211 have been described in FIGS. 1 to 11, and a detailed description thereof will be omitted herein.

The receiver 1215 receives various signals and various messages from the other entities included in the mobile communication network under a control of the controller 1213. The various signals and the various messages received by the receiver 1215 have been described in FIGS. 1 to 11, and a detailed description thereof will be omitted herein.

The storage unit 1217 stores a program, various data, and/or the like related to the operation related to the operation of transmitting/receiving the signal based on the traffic characteristic in the mobile communication network according to an embodiment of the present disclosure which the UE 1200 performs under a control of the controller 1213.

The storage unit 1217 stores the various signals and various messages received by the receiver 1215 from the other entities.

Although the transmitter 1211, the controller 1213, the receiver 1215, and the storage unit 1217 are described as separate units in the UE 1200 in FIG. 12, it is to be understood that the UE 1200 may be implemented with a form into which at least two of the transmitter 1211, the controller 1213, the receiver 1215, and the storage unit 1217 are incorporated.

The UE 1200 may be implemented with one processor.

An inner structure of a UE in a mobile communication network according to an embodiment of the present disclosure has been described with reference to FIG. 12, and an inner structure of an eNB in a mobile communication network according to an embodiment of the present disclosure will be described with reference to FIG. 13.

Figure 13:
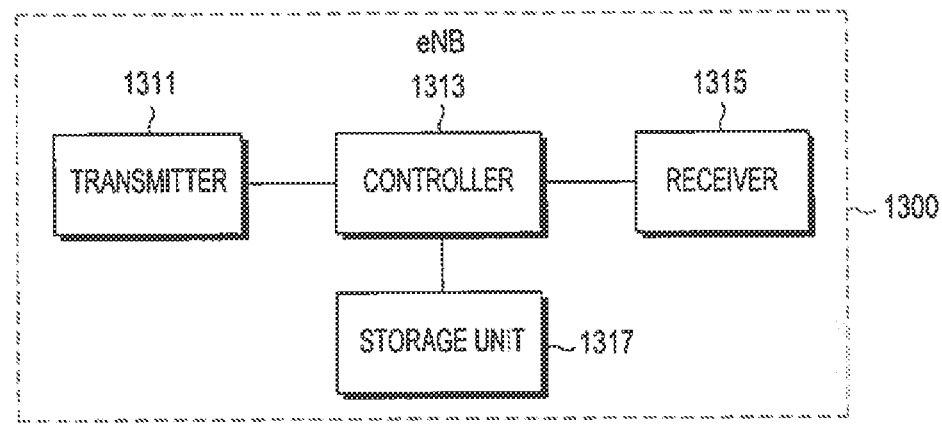
FIG. 13 schematically illustrates an inner structure of an eNB in a mobile communication network according to an embodiment of the present disclosure.

FIG. 13 schematically illustrates an inner structure of an eNB in a mobile communication network according to an embodiment of the present disclosure.

Referring to FIG. 13, an eNB 1300 includes a transmitter 1311, a controller 1313, a receiver 1315, and a storage unit 1317.

The controller 1313 controls the overall operation of the eNB 1300, and more particularly, controls an operation related to an operation of transmitting/receiving a signal based on a traffic characteristic in a mobile communication network according to an embodiment of the present disclosure. The operation related to the operation of transmitting/receiving the signal based on the traffic characteristic in the mobile communication network according to an embodiment of the present disclosure has been described with reference to FIGS. 1 to 11, and a detailed description thereof will be omitted herein.

The transmitter 1311 transmits various signals and various messages to other entities included in the mobile communication network under a control of the controller 1313. The various signals and the various messages transmitted by the transmitter 1311 have been described in FIGS. 1 to 11, and a detailed description thereof will be omitted herein.

The receiver 1315 receives various signals and various messages from the other entities included in the mobile communication network under a control of the controller 1313. The various signals and the various messages received by the receiver 1315 have been described in FIGS. 1 to 11, and a detailed description thereof will be omitted herein.

The storage unit 1317 stores a program, various data, and/or the like related to the operation related to the operation of transmitting/receiving the signal based on the traffic characteristic in the mobile communication network according to an embodiment of the present disclosure which the eNB 1300 performs under a control of the controller 1313.

The storage unit 1317 stores the various signals and various messages received by the receiver 1315 from the other entities.

Although the transmitter 1311, the controller 1313, the receiver 1315, and the storage unit 1317 are described as separate units in the eNB 1300 in FIG. 13, it is to be understood that the eNB 1300 may be implemented with a form into which at least two of the transmitter 1311, the controller 1313, the receiver 1315, and the storage unit 1317 are incorporated.

The eNB 1300 may be implemented with one processor.

An inner structure of an eNB in a mobile communication network according to an embodiment of the present disclosure has been described with reference to FIG. 13, and an inner structure of an AP in a mobile communication network according to an embodiment of the present disclosure will be described with reference to FIG. 14.

Figure 14:
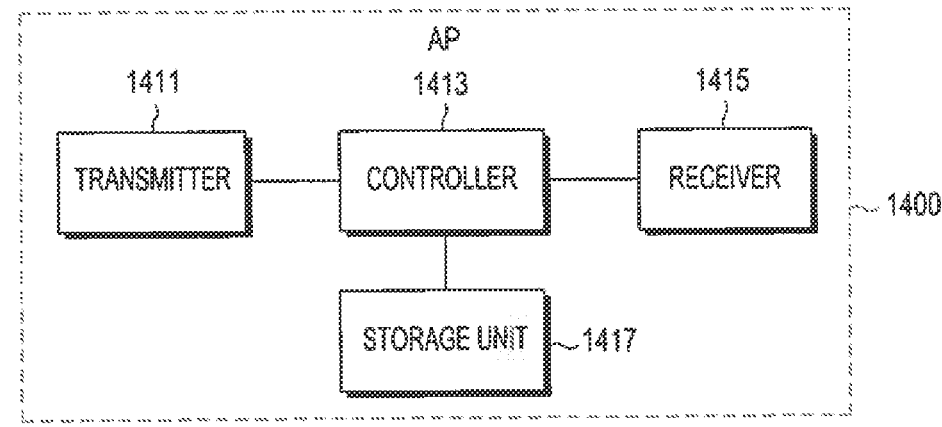
FIG. 14 schematically illustrates an inner structure of an AP in a mobile communication network according to an embodiment of the present disclosure.

FIG. 14 schematically illustrates an inner structure of an AP in a mobile communication network according to an embodiment of the present disclosure.

Referring to FIG. 14, an AP 1400 includes a transmitter 1411, a controller 1413, a receiver 1415, and a storage unit 1417.

The controller 1413 controls the overall operation of the AP 1400, and more particularly, controls an operation related to an operation of transmitting/receiving a signal based on a traffic characteristic in a mobile communication network according to an embodiment of the present disclosure. The operation related to the operation of transmitting/receiving the signal based on the traffic characteristic in the mobile communication network according to an embodiment of the present disclosure has been described with reference to FIGS. 1 to 11, and a detailed description thereof will be omitted herein.

The transmitter 1411 transmits various signals and various messages to other entities included in the mobile communication network under a control of the controller 1413. The various signals and the various messages transmitted by the transmitter 1411 have been described in FIGS. 1 to 11, and a detailed description thereof will be omitted herein.

The receiver 1415 receives various signals and various messages from the other entities included in the mobile communication network under a control of the controller 1413. The various signals and the various messages received by the receiver 1415 have been described in FIGS. 1 to 11, and a detailed description thereof will be omitted herein.

The storage unit 1417 stores a program, various data, and/or the like related to the operation related to the operation of transmitting/receiving the signal based on the traffic characteristic in the mobile communication network according to an embodiment of the present disclosure which the AP 1400 performs under a control of the controller 1413.

The storage unit 1417 stores the various signals and various messages received by the receiver 1415 from the other entities.

Although the transmitter 1411, the controller 1413, the receiver 1415, and the storage unit 1417 are described as separate units in the AP 1400 in FIG. 14, it is to be understood that the AP 1400 may be implemented with a form into which at least two of the transmitter 1411, the controller 1413, the receiver 1415, and the storage unit 1417 are incorporated.

The AP 1400 may be implemented with one processor.

An inner structure of an AP in a mobile communication network according to an embodiment of the present disclosure has been described with reference to FIG. 14, and an inner structure of an MME in a mobile communication network according to an embodiment of the present disclosure will be described with reference to FIG. 15.

Figure 15:
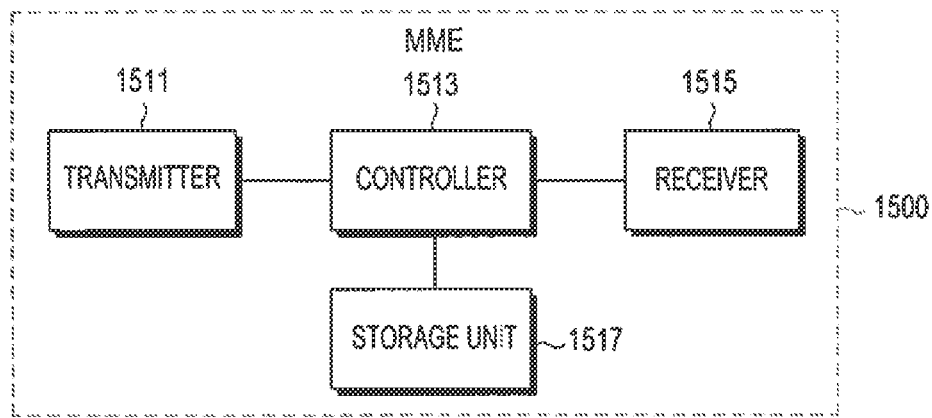
FIG. 15 schematically illustrates an inner structure of an MME in a mobile communication network according to an embodiment of the present disclosure.

FIG. 15 schematically illustrates an inner structure of an MME in a mobile communication network according to an embodiment of the present disclosure.

Referring to FIG. 15, an MME 1500 includes a transmitter 1511, a controller 1513, a receiver 1515, and a storage unit 1517.

The controller 1513 controls the overall operation of the MME 1500, and more particularly, controls an operation related to an operation of transmitting/receiving a signal based on a traffic characteristic in a mobile communication network according to an embodiment of the present disclosure. The operation related to the operation of transmitting/receiving the signal based on the traffic characteristic in the mobile communication network according to an embodiment of the present disclosure has been described with reference to FIGS. 1 to 11, and a detailed description thereof will be omitted herein.

The transmitter 1511 transmits various signals and various messages to other entities included in the mobile communication network under a control of the controller 1513. The various signals and the various messages transmitted by the transmitter 1511 have been described in FIGS. 1 to 11, and a detailed description thereof will be omitted herein.

The receiver 1515 receives various signals and various messages from the other entities included in the mobile communication network under a control of the controller 1513. The various signals and the various messages received by the receiver 1515 have been described in FIGS. 1 to 11, and a detailed description thereof will be omitted herein.

The storage unit 1517 stores a program, various data, and/or the like related to the operation related to the operation of transmitting/receiving the signal based on the traffic characteristic in the mobile communication network according to an embodiment of the present disclosure which the MME 1500 performs under a control of the controller 1513.

The storage unit 1517 stores the various signals and various messages received by the receiver 1515 from the other entities.

Although the transmitter 1511, the controller 1513, the receiver 1515, and the storage unit 1517 are described as separate units in the MME 1500 in FIG. 15, it is to be understood that the MME 1500 may be implemented with a form into which at least two of the transmitter 1511, the controller 1513, the receiver 1515, and the storage unit 1517 are incorporated.

The MME 1500 may be implemented with one processor.

An inner structure of an MME in a mobile communication network according to an embodiment of the present disclosure has been described with reference to FIG. 15, and an inner structure of an SGW in a mobile communication network according to an embodiment of the present disclosure will be described with reference to FIG. 16.

Figure 16:
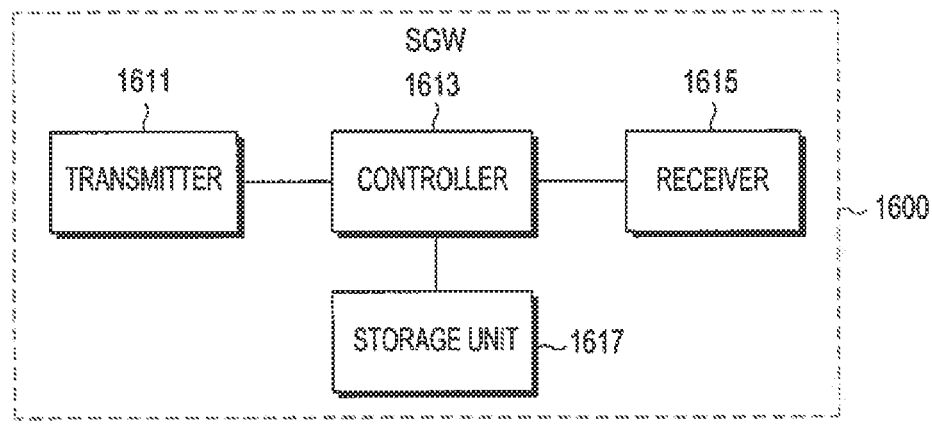
FIG. 16 schematically illustrates an inner structure of an SGW in a mobile communication network according to an embodiment of the present disclosure.

FIG. 16 schematically illustrates an inner structure of an SGW in a mobile communication network according to an embodiment of the present disclosure.

Referring to FIG. 16, an SGW 1600 includes a transmitter 1611, a controller 1613, a receiver 1615, and a storage unit 1617.

The controller 1613 controls the overall operation of the SGW 1600, and more particularly, controls an operation related to an operation of transmitting/receiving a signal based on a traffic characteristic in a mobile communication network according to an embodiment of the present disclosure. The operation related to the operation of transmitting/receiving the signal based on the traffic characteristic in the mobile communication network according to an embodiment of the present disclosure has been described with reference to FIGS. 1 to 11, and a detailed description thereof will be omitted herein.

The transmitter 1611 transmits various signals and various messages to other entities included in the mobile communication network under a control of the controller 1613. The various signals and the various messages transmitted by the transmitter 1611 have been described in FIGS. 1 to 11, and a detailed description thereof will be omitted herein.

The receiver 1615 receives various signals and various messages from the other entities included in the mobile communication network under a control of the controller 1613. The various signals and the various messages received by the receiver 1615 have been described in FIGS. 1 to 11, and a detailed description thereof will be omitted herein.

The storage unit 1617 stores a program, various data, and/or the like related to the operation related to the operation of transmitting/receiving the signal based on the traffic characteristic in the mobile communication network according to an embodiment of the present disclosure which the SGW 1600 performs under a control of the controller 1613.

The storage unit 1617 stores the various signals and various messages received by the receiver 1615 from the other entities.

Although the transmitter 1611, the controller 1613, the receiver 1615, and the storage unit 1617 are described as separate units in the SGW 1600 in FIG. 16, it is to be understood that the SGW 1600 may be implemented with a form into which at least two of the transmitter 1611, the controller 1613, the receiver 1615, and the storage unit 1617 are incorporated.

The SGW 1600 may be implemented with one processor.

An inner structure of an SGW in a mobile communication network according to an embodiment of the present disclosure has been described with reference to FIG. 16, and an inner structure of a PGW in a mobile communication network according to an embodiment of the present disclosure will be described with reference to FIG. 17.

Figure 17:
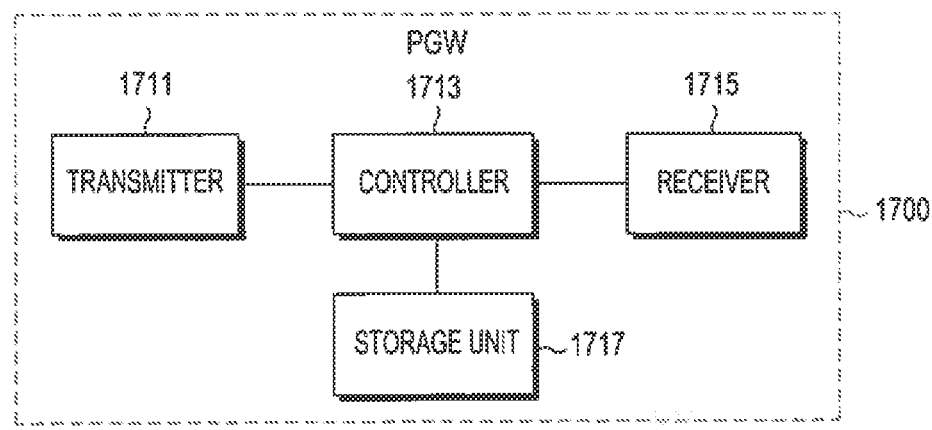
FIG. 17 schematically illustrates an inner structure of a PGW in a mobile communication network according to an embodiment of the present disclosure.

FIG. 17 schematically illustrates an inner structure of a PGW in a mobile communication network according to an embodiment of the present disclosure.

Referring to FIG. 17, a PGW 1700 includes a transmitter 1711, a controller 1713, a receiver 1715, and a storage unit 1717.

The controller 1713 controls the overall operation of the PGW 1700, and more particularly, controls an operation related to an operation of transmitting/receiving a signal based on a traffic characteristic in a mobile communication network according to an embodiment of the present disclosure. The operation related to the operation of transmitting/receiving the signal based on the traffic characteristic in the mobile communication network according to an embodiment of the present disclosure has been described with reference to FIGS. 1 to 11, and a detailed description thereof will be omitted herein.

The transmitter 1711 transmits various signals and various messages to other entities included in the mobile communication network under a control of the controller 1713. The various signals and the various messages transmitted by the transmitter 1711 have been described in FIGS. 1 to 11, and a detailed description thereof will be omitted herein.

The receiver 1715 receives various signals and various messages from the other entities included in the mobile communication network under a control of the controller 1713. The various signals and the various messages received by the receiver 1715 have been described in FIGS. 1 to 11, and a detailed description thereof will be omitted herein.

The storage unit 1717 stores a program, various data, and/or the like related to the operation related to the operation of transmitting/receiving the signal based on the traffic characteristic in the mobile communication network according to an embodiment of the present disclosure which the PGW 1700 performs under a control of the controller 1713.

The storage unit 1717 stores the various signals and various messages received by the receiver 1715 from the other entities.

Although the transmitter 1711, the controller 1713, the receiver 1715, and the storage unit 1717 are described as separate units in the PGW 1700 in FIG. 17, it is to be understood that the PGW 1700 may be implemented with a form into which at least two of the transmitter 1711, the controller 1713, the receiver 1715, and the storage unit 1717 are incorporated.

The PGW 1700 may be implemented with one processor.

An inner structure of a PGW in a mobile communication network according to an embodiment of the present disclosure has been described with reference to FIG. 17, and an inner structure of a PCRF entity in a mobile communication network according to an embodiment of the present disclosure will be described with reference to FIG. 18.

Figure 18:
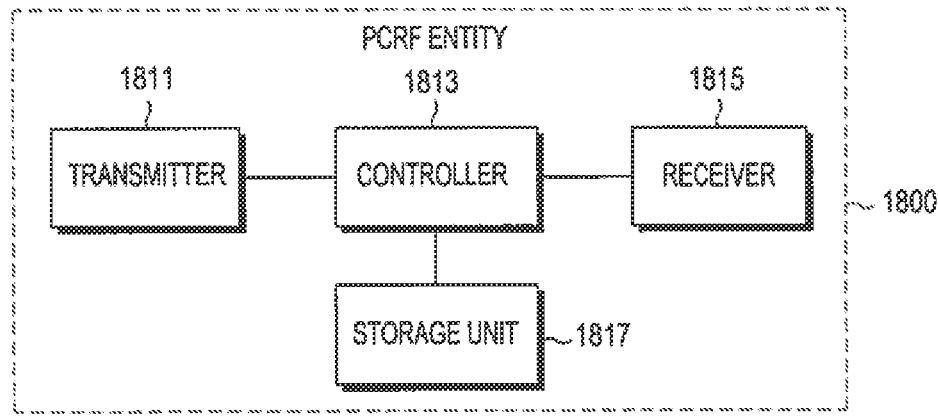
FIG. 18 schematically illustrates an inner structure of a PCRF entity in a mobile communication network according to an embodiment of the present disclosure.

FIG. 18 schematically illustrates an inner structure of a PCRF entity in a mobile communication network according to an embodiment of the present disclosure.

Referring to FIG. 18, a PCRF entity 1800 includes a transmitter 1811, a controller 1813, a receiver 1815, and a storage unit 1817.

The controller 1813 controls the overall operation of the PCRF entity 1800, and more particularly, controls an operation related to an operation of transmitting/receiving a signal based on a traffic characteristic in a mobile communication network according to an embodiment of the present disclosure. The operation related to the operation of transmitting/receiving the signal based on the traffic characteristic in the mobile communication network according to an embodiment of the present disclosure has been described with reference to FIGS. 1 to 11, and a detailed description thereof will be omitted herein.

The transmitter 1811 transmits various signals and various messages to other entities included in the mobile communication network under a control of the controller 1813. The various signals and the various messages transmitted by the transmitter 1811 have been described in FIGS. 1 to 11, and a detailed description thereof will be omitted herein.

The receiver 1815 receives various signals and various messages from the other entities included in the mobile communication network under a control of the controller 1813. The various signals and the various messages received by the receiver 1815 have been described in FIGS. 1 to 11, and a detailed description thereof will be omitted herein.

The storage unit 1817 stores a program, various data, and/or the like related to the operation related to the operation of transmitting/receiving the signal based on the traffic characteristic in the mobile communication network according to an embodiment of the present disclosure which the PCRF entity 1800 performs under a control of the controller 1813.

The storage unit 1817 stores the various signals and various messages received by the receiver 1815 from the other entities.

Although the transmitter 1811, the controller 1813, the receiver 1815, and the storage unit 1817 are described as separate units in the PCRF entity 1800 in FIG. 18, it is to be understood that the PCRF entity 1800 may be implemented with a form into which at least two of the transmitter 1811, the controller 1813, the receiver 1815, and the storage unit 1817 are incorporated.

The PCRF entity 1800 may be implemented with one processor.

An inner structure of a PCRF entity in a mobile communication network according to an embodiment of the present disclosure has been described with reference to FIG. 18, and an inner structure of an HSS in a mobile communication network according to an embodiment of the present disclosure will be described with reference to FIG. 19.

Figure 19:
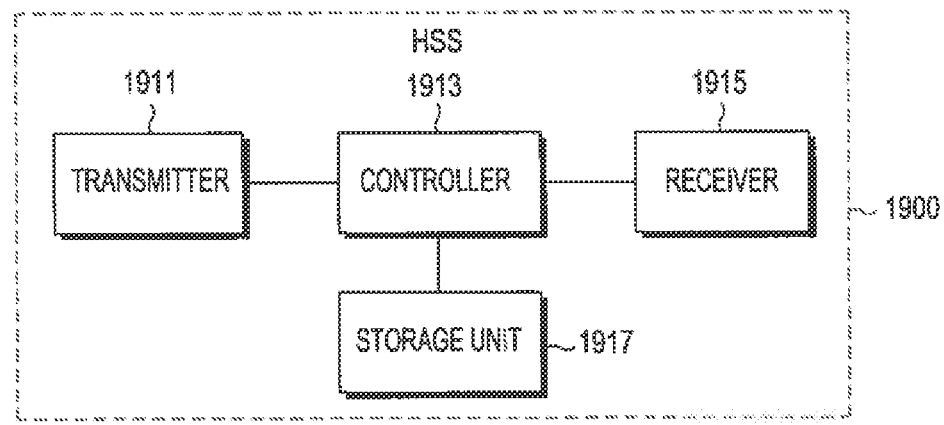
FIG. 19 schematically illustrates an inner structure of an HSS in a mobile communication network according to an embodiment of the present disclosure.

FIG. 19 schematically illustrates an inner structure of an HSS in a mobile communication network according to an embodiment of the present disclosure.

Referring to FIG. 19, an HSS 1900 includes a transmitter 1911, a controller 1913, a receiver 1915, and a storage unit 1917.

The controller 1913 controls the overall operation of the HSS 1900, and more particularly, controls an operation related to an operation of transmitting/receiving a signal based on a traffic characteristic in a mobile communication network according to an embodiment of the present disclosure. The operation related to the operation of transmitting/receiving the signal based on the traffic characteristic in the mobile communication network according to an embodiment of the present disclosure has been described with reference to FIGS. 1 to 11, and a detailed description thereof will be omitted herein.

The transmitter 1911 transmits various signals and various messages to other entities included in the mobile communication network under a control of the controller 1913. The various signals and the various messages transmitted by the transmitter 1911 have been described in FIGS. 1 to 11, and a detailed description thereof will be omitted herein.

The receiver 1915 receives various signals and various messages from the other entities included in the mobile communication network under a control of the controller 1913. The various signals and the various messages received by the receiver 1915 have been described in FIGS. 1 to 11, and a detailed description thereof will be omitted herein.

The storage unit 1917 stores a program, various data, and/or the like related to the operation related to the operation of transmitting/receiving the signal based on the traffic characteristic in the mobile communication network according to an embodiment of the present disclosure which the HSS 1900 performs under a control of the controller 1913.

The storage unit 1917 stores the various signals and various messages received by the receiver 1915 from the other entities.

Although the transmitter 1911, the controller 1913, the receiver 1915, and the storage unit 1917 are described as separate units in the HSS 1900 in FIG. 19, it is to be understood that the HSS 1900 may be implemented with a form into which at least two of the transmitter 1911, the controller 1913, the receiver 1915, and the storage unit 1917 are incorporated.

The HSS 1900 may be implemented with one processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a base station in a mobile communication network, comprising:
 detecting a traffic characteristic for traffic provided to a terminal;
 determining a first radio access technology (RAT) to be applied to an uplink for the terminal and a second RAT to be applied to a downlink for the terminal based on the traffic characteristic and based on at least one of a mobile communication service provider policy and subscriber information of the terminal;
 communicating with the terminal based on the first RAT and the second RAT;
 calculating a ratio of downlink traffic to uplink traffic;
 comparing the calculated ratio with a threshold;
 in response to the calculated ratio exceeding the threshold, transmitting downlink traffic through a wireless local access network (LAN) scheme and receiving uplink traffic through a long term evolution (LTE) scheme; and
 in response to the calculated ratio not exceeding the threshold, transmitting the downlink traffic and receiving the uplink traffic through the wireless LAN scheme,
 wherein the traffic characteristic comprises the ratio of downlink traffic to uplink traffic.

2. The method of claim 1, wherein the traffic characteristic further includes at least one of a packet size and a time interval between packets.

3. The method of claim 1, wherein the mobile communication service provider policy includes information in which a suitable RAT is mapped onto each traffic characteristic.

4. The method of claim 3, wherein, if the traffic is downlink-dominated application traffic, the first RAT uses a licensed band.

5. The method of claim 4, wherein the downlink-dominated application traffic is traffic of which the ratio of downlink traffic to uplink traffic is greater than the threshold.

6. The method of claim 3, wherein, if the traffic is not the downlink-dominated application traffic, the first RAT uses an unlicensed band.

7. The method of claim 6, wherein the downlink-dominated application traffic is traffic of which the ratio of downlink traffic to uplink traffic is greater than the threshold.

8. The method of claim 1, wherein the mobile communication service provider policy includes information in which a suitable RAT is mapped onto each traffic direction.

9. The method of claim 8, wherein, if the traffic is security-related traffic, the mobile communication service provider policy causes a RAT which uses a licensed band to be used for uplink traffic.

10. A base station in a mobile communication network, comprising:
    a transceiver; and
    a controller connected to the transceiver, and configured to:
        detect a traffic characteristic for traffic provided to a terminal,
        determine a first radio access technology (RAT) to be applied to an uplink for the terminal and a second RAT to be applied to a downlink for the terminal based on the traffic characteristic and based on at least one of a mobile communication service provider policy and subscriber information of the terminal,
        control a communication with the terminal based on the first RAT and the second RAT,
        calculate a ratio of downlink traffic to uplink traffic,
        compare the calculated ratio with a threshold,
        in response to the calculated ratio exceeding the threshold, control transmitting downlink traffic through a wireless local access network (LAN) scheme and receiving uplink traffic through a long term evolution (LTE) scheme, and
        in response to the calculated ratio not exceeding the threshold, control transmitting the downlink traffic and receiving the uplink traffic through the wireless LAN scheme,
    wherein the traffic characteristic comprises the ratio of downlink traffic to uplink traffic.

11. The base station of claim 10, wherein the traffic characteristic further includes at least one of a packet size and a time interval between packets.

12. The base station of claim 10, wherein the mobile communication service provider policy includes information in which a suitable RAT is mapped onto each traffic characteristic.

13. The base station of claim 12, wherein, if the traffic is downlink-dominated application traffic, the first RAT uses a licensed band.

14. The base station of claim 13, wherein the downlink-dominated application traffic is traffic of which a ratio of downlink traffic to uplink traffic is greater than the threshold.

15. The base station of claim 12, wherein, if the traffic is not the downlink-dominated application traffic, the first RAT uses an unlicensed band.

16. The base station of claim 15, wherein the downlink-dominated application traffic is traffic of which a ratio of downlink traffic to uplink traffic is greater than the threshold.

17. The base station of claim 10, wherein the mobile communication service provider policy includes information in which a suitable RAT is mapped onto each traffic direction.

18. The base station of claim 17, wherein, if the traffic is security-related traffic, the mobile communication service provider policy causes a RAT which uses a licensed band to be used for uplink traffic.

* * * * *